United States Patent
Woodruff et al.

(10) Patent No.: US 10,724,480 B1
(45) Date of Patent: Jul. 28, 2020

(54) MONOFILAMENT VAPORIZATION PROPULSION SYSTEMS

(71) Applicant: CU Aerospace, LLC, Champaign, IL (US)

(72) Inventors: Curtis Woodruff, Savoy, IL (US);
Darren King, Champaign, IL (US);
Rodney Burton, Champaign, IL (US);
David L. Carroll, Champaign, IL (US);
Neil John Nejmanowski, Urbana, IL (US)

(73) Assignee: CU Aerospace, LLC, Champaign, IL (US)

( * ) Notice: Subject to any disclaimer, the term of this patent is extended or adjusted under 35 U.S.C. 154(b) by 199 days.

(21) Appl. No.: 15/922,966

(22) Filed: Mar. 16, 2018

Related U.S. Application Data

(60) Provisional application No. 62/472,702, filed on Mar. 17, 2017.

(51) Int. Cl.
| | |
|---|---|
| *F02K 9/24* | (2006.01) |
| *F02K 9/97* | (2006.01) |
| *F02K 9/34* | (2006.01) |
| *F02K 9/10* | (2006.01) |

(52) U.S. Cl.
CPC ............... *F02K 9/24* (2013.01); *F02K 9/10* (2013.01); *F02K 9/346* (2013.01); *F02K 9/97* (2013.01)

(58) Field of Classification Search
CPC ..... F02K 9/24; F03H 1/00–0093; B64G 1/405; B64G 1/406
See application file for complete search history.

(56) References Cited

U.S. PATENT DOCUMENTS

| | | | |
|---|---|---|---|
| 7,530,219 B1 * | 5/2009 | Burton | F03H 1/0087 60/202 |
| 9,334,855 B1 * | 5/2016 | Hruby | F03H 1/00 |
| 2017/0211554 A1 * | 7/2017 | Childress | B64G 4/00 |
| 2019/0329911 A1 * | 10/2019 | Kronhaus | B64G 1/406 |

\* cited by examiner

*Primary Examiner* — Gerald L Sung
*Assistant Examiner* — William L Breazeal
(74) *Attorney, Agent, or Firm* — Adam K. Sacharoff; Much Shelist, PC

(57) ABSTRACT

The monofilament vaporization propulsion system in accordance with an embodiment of the invention includes a mechanical feed, an elongated barrel, a heater block, a tube, and a nozzle. A monofilament solid propellant is wound around a spool and fed into the mechanical feed. The elongated barrel is configured to receive the solid propellant towards a second end. The heater block is positioned near the second end of the barrel and configured to heat the propellant into a liquid propellant as the solid propellant moves towards the second end. The tube receives the liquid propellant and is configured to evaporate the liquid propellant into a gaseous propellant. The gaseous propellant enters a nozzle in communication with the tube. The gaseous propellant being fed into the nozzle entrance expands therethrough to create propulsion out an nozzle exit.

11 Claims, 29 Drawing Sheets

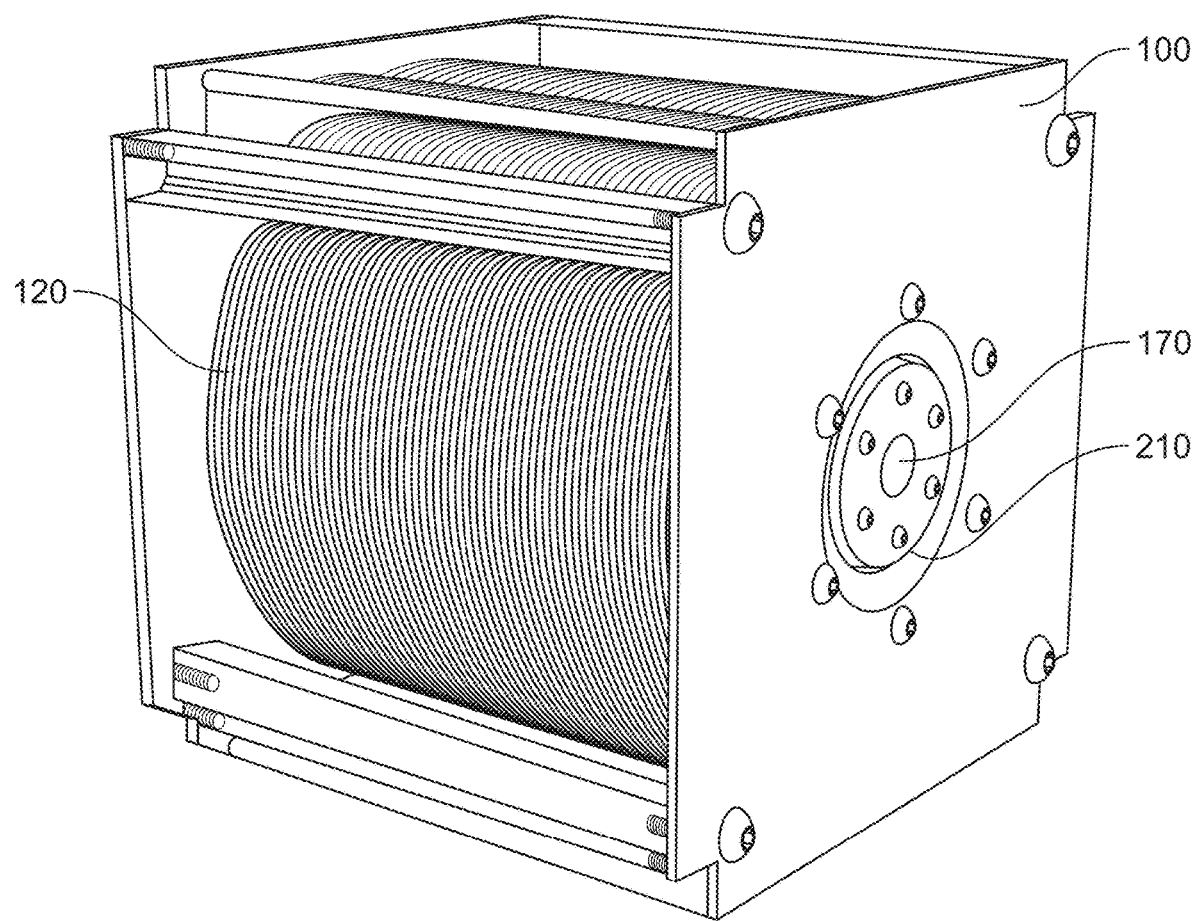
FIG. 1  Baseline 1U MVP System

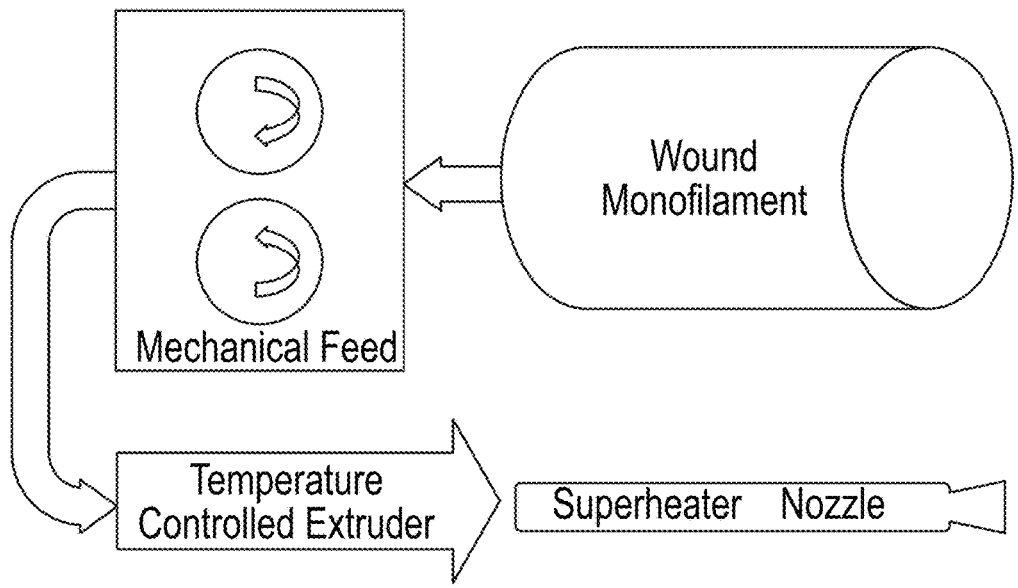
FIG. 2 MVP Block Diagram
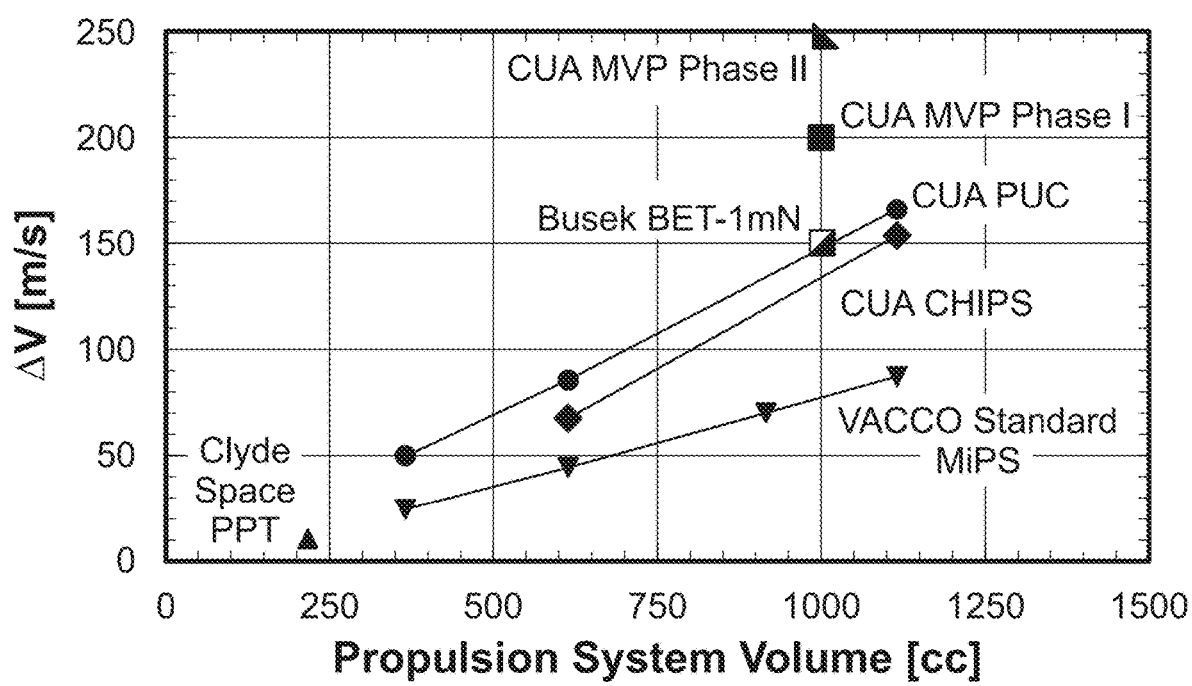
FIG. 3
ΔV for a 4 kg satellite vs. propulsion system volume for various electric propulsion systems

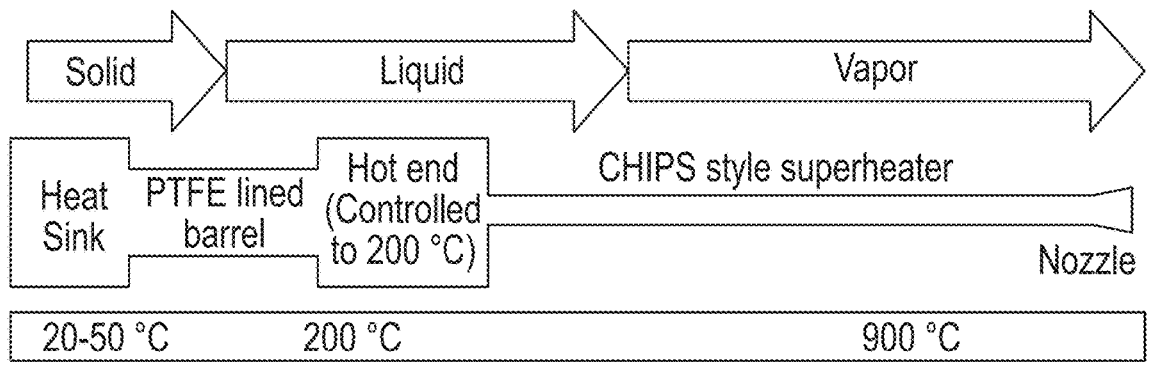
FIG. 4  Propellant phase change through MVP
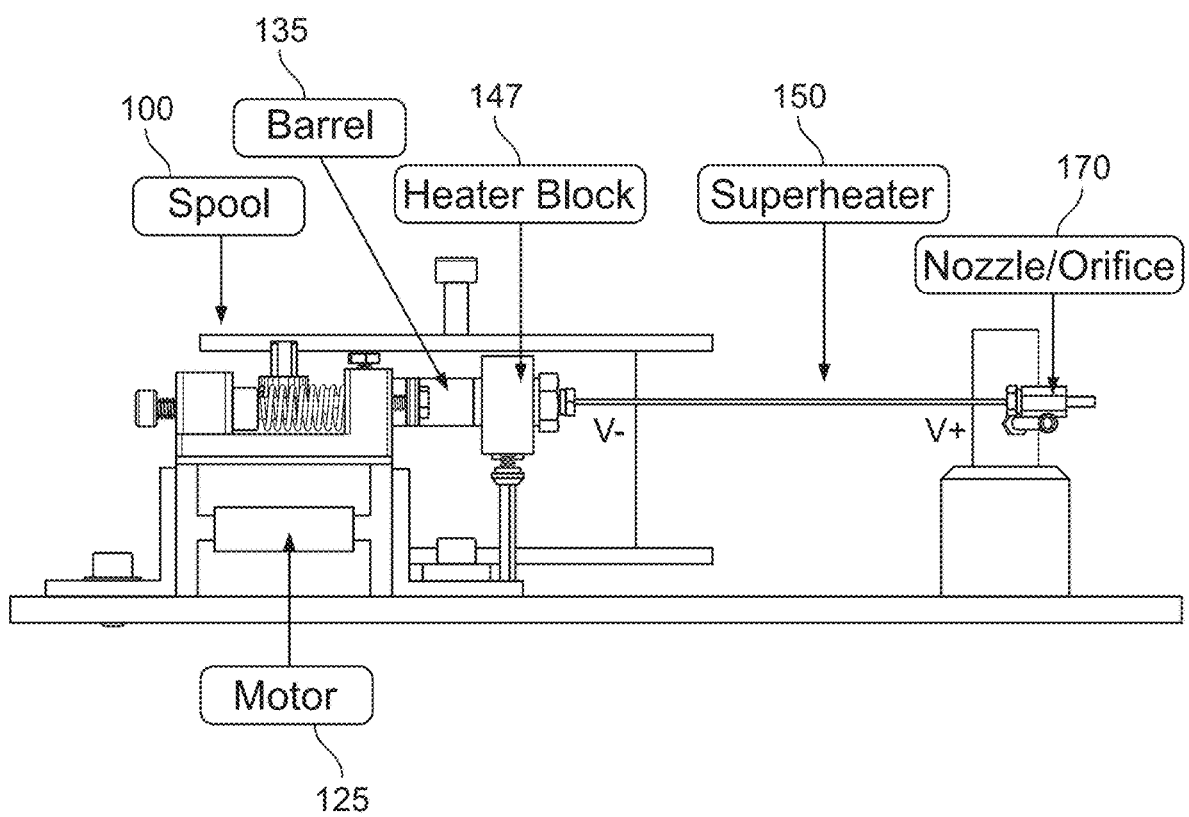
FIG. 5  MVP operation and breadboard apparatus

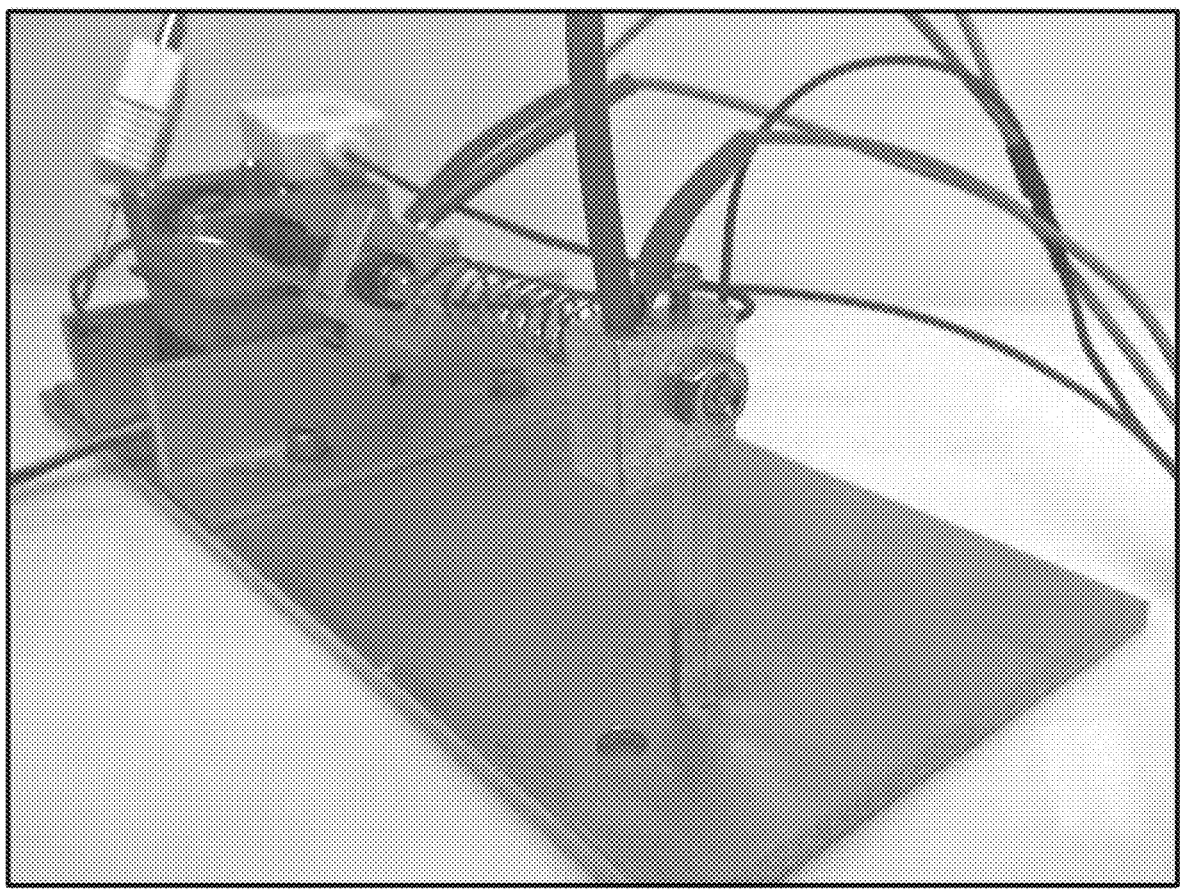
FIG. 6 MVP breadboard with 30 cm coiled tube.

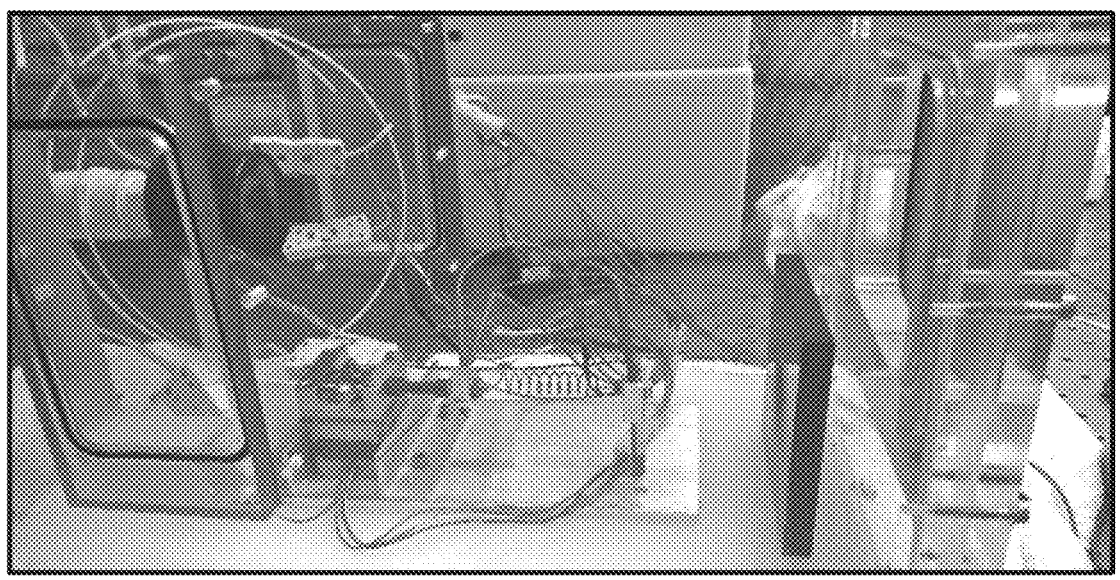
FIG. 8 MVP breadboard in clear acrylic vacuum tank

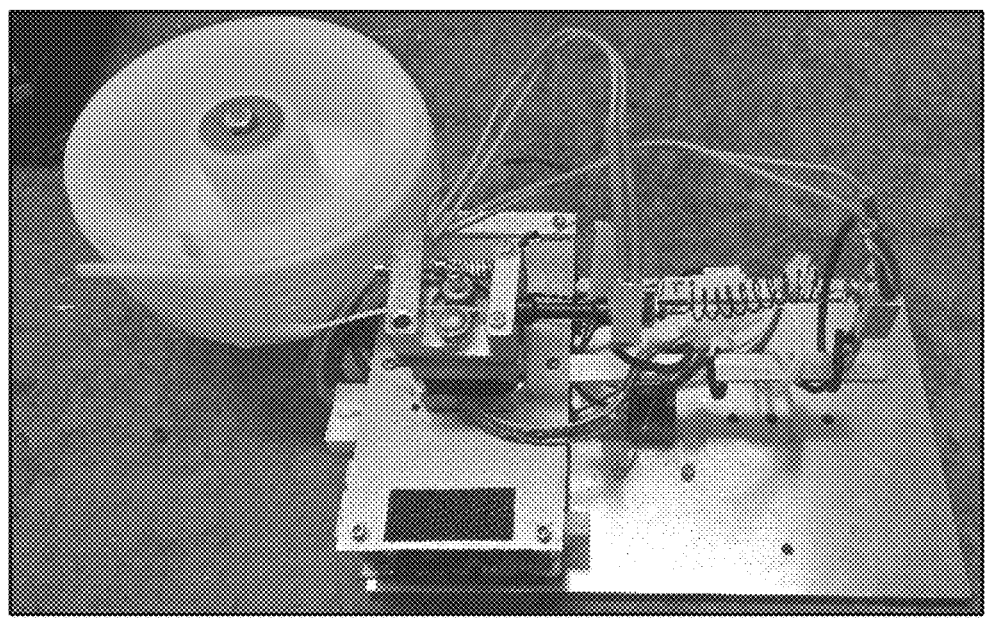
FIG. 9  Breadboard ready for thrust stand
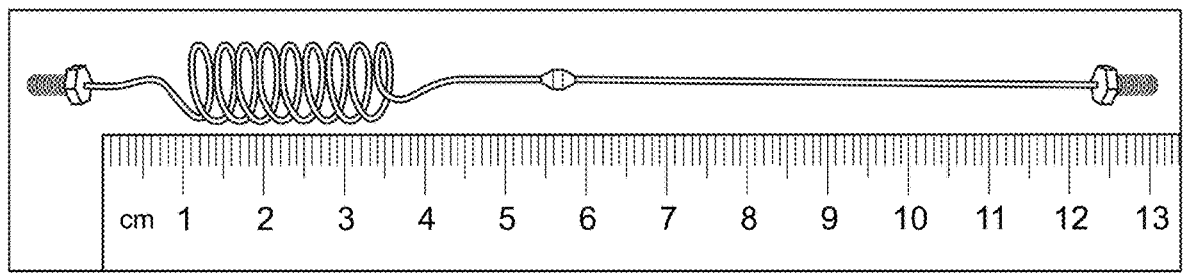
FIG. 10  Two-stage superheater

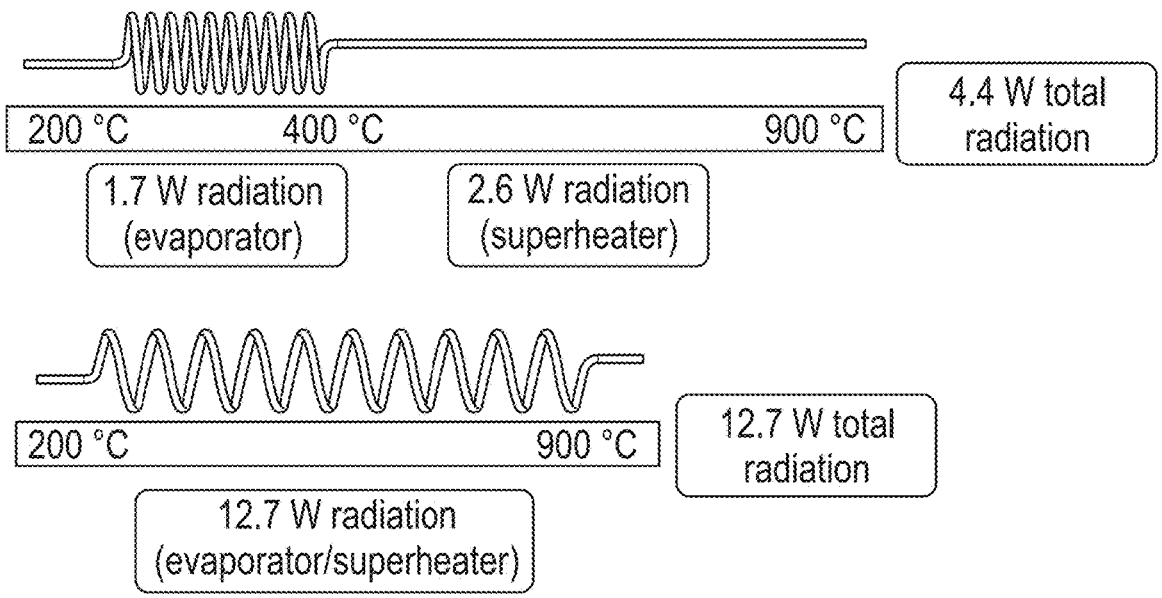
FIG. 11  Radiation modeling of superheater variants
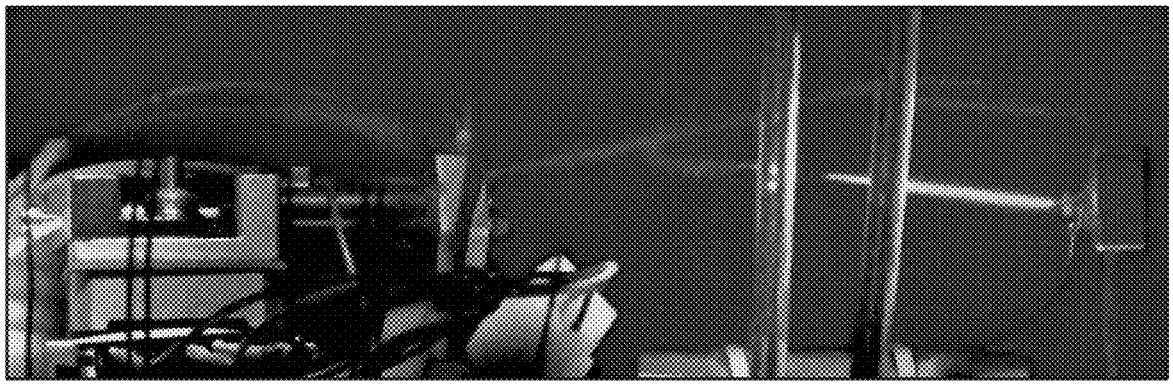
FIG. 12
Two-stage superheater operation with flowing propellant (flow is left to right).

Superheater tube geometry performance comparison,
POM propellant

Breadboard setup with radiation shield (flow is left to right)

Comparison between shielded and unshielded two-stage superheaters, POM propellant Propellant storage and feed methodology. Fiber is fed around spool rim into the core.

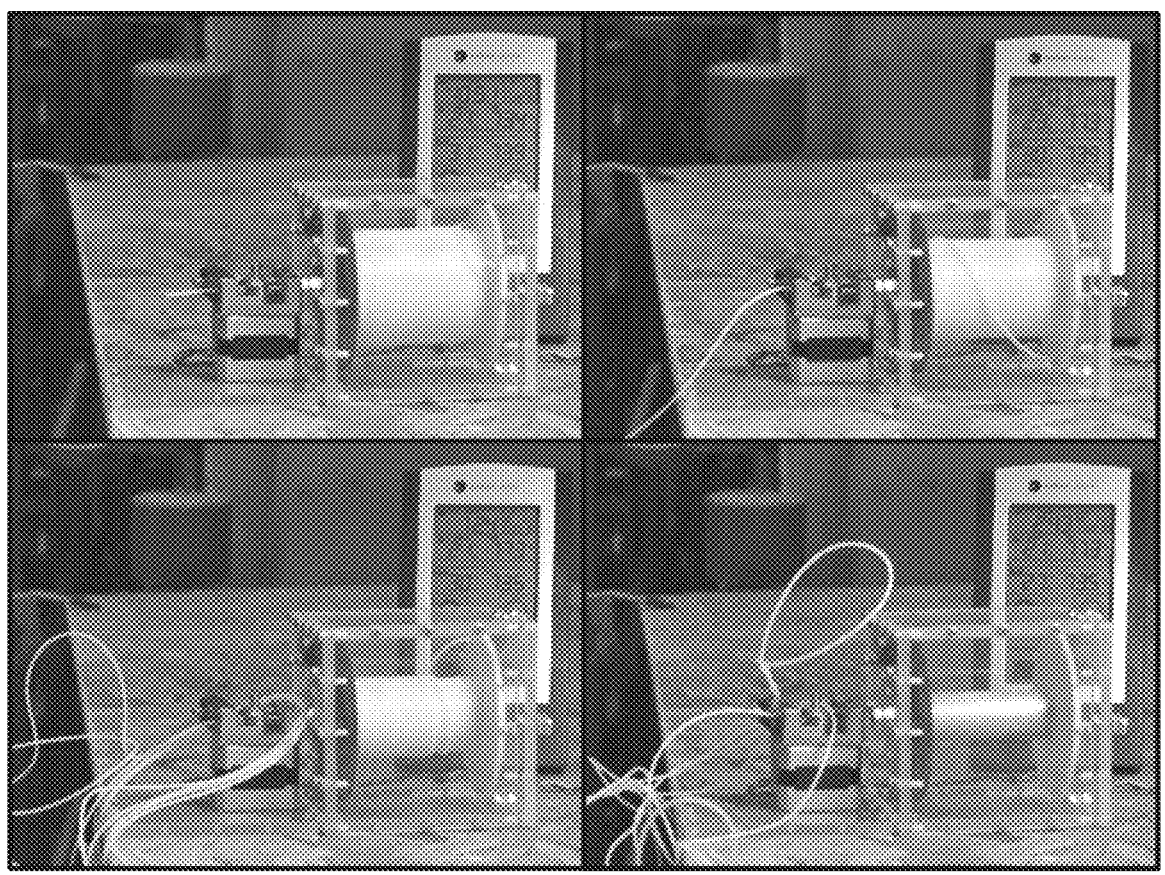
FIG. 17  MVP mockup fiber feed test

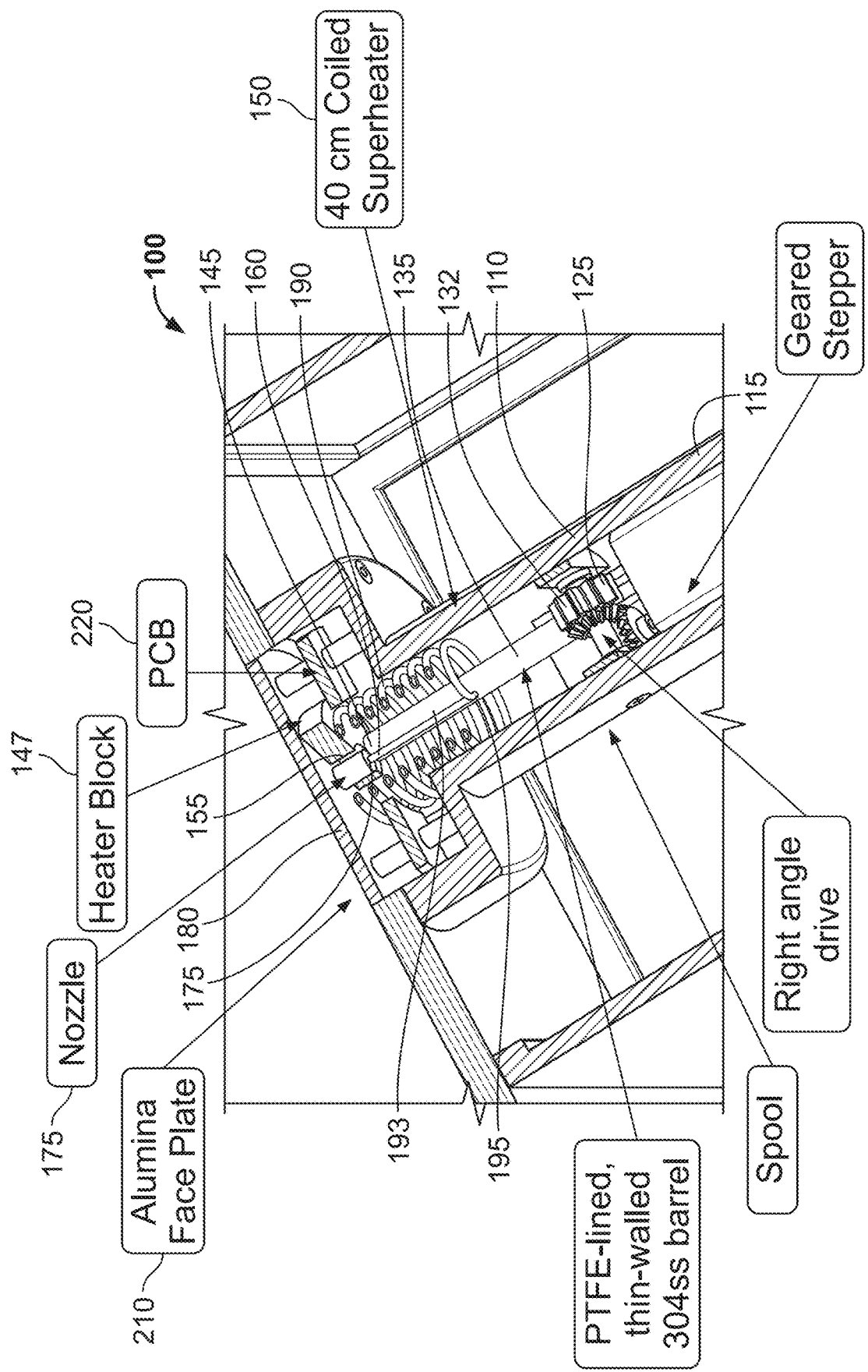
FIG. 18A  1U MVP Thruster

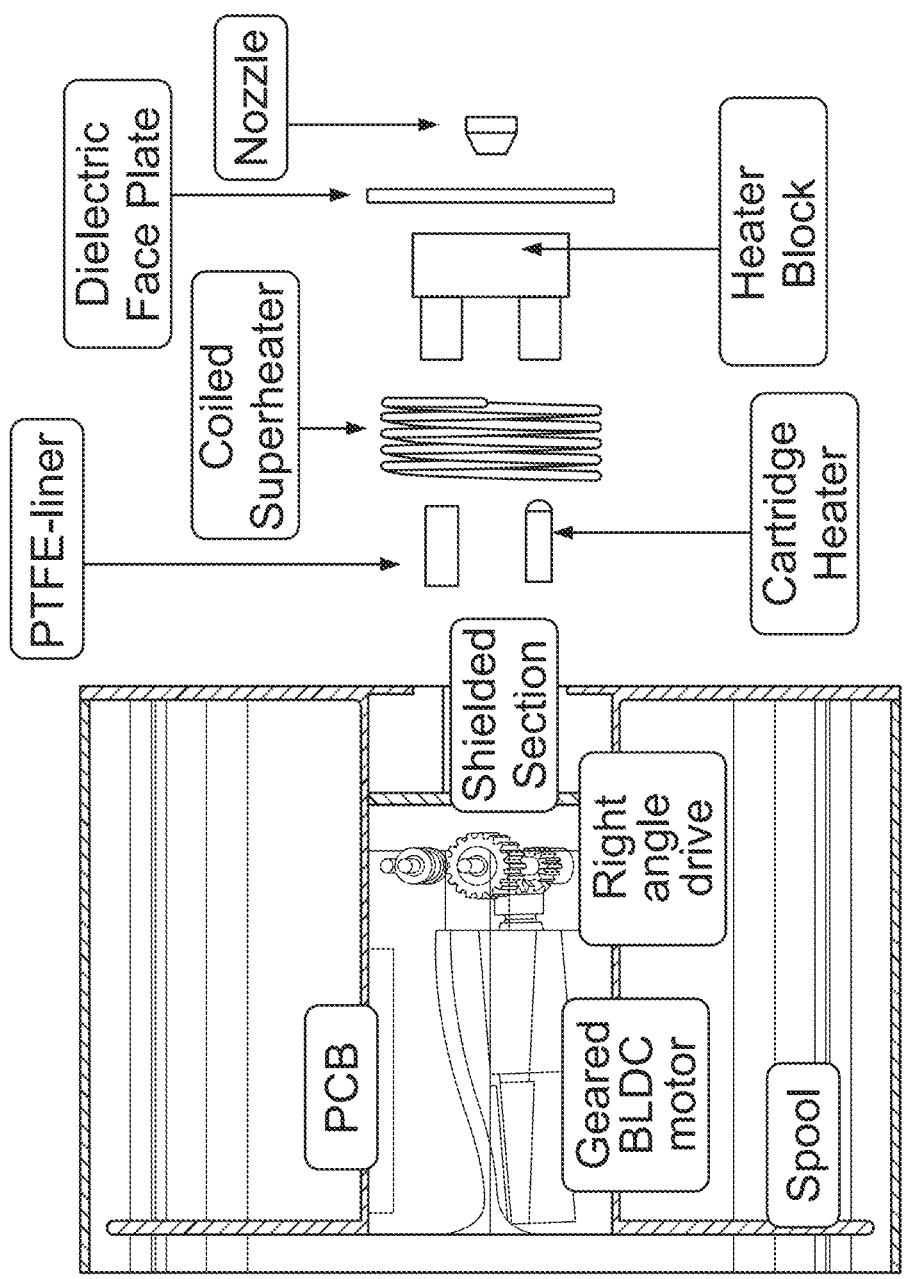
FIG. 18B  1U MVP Thruster

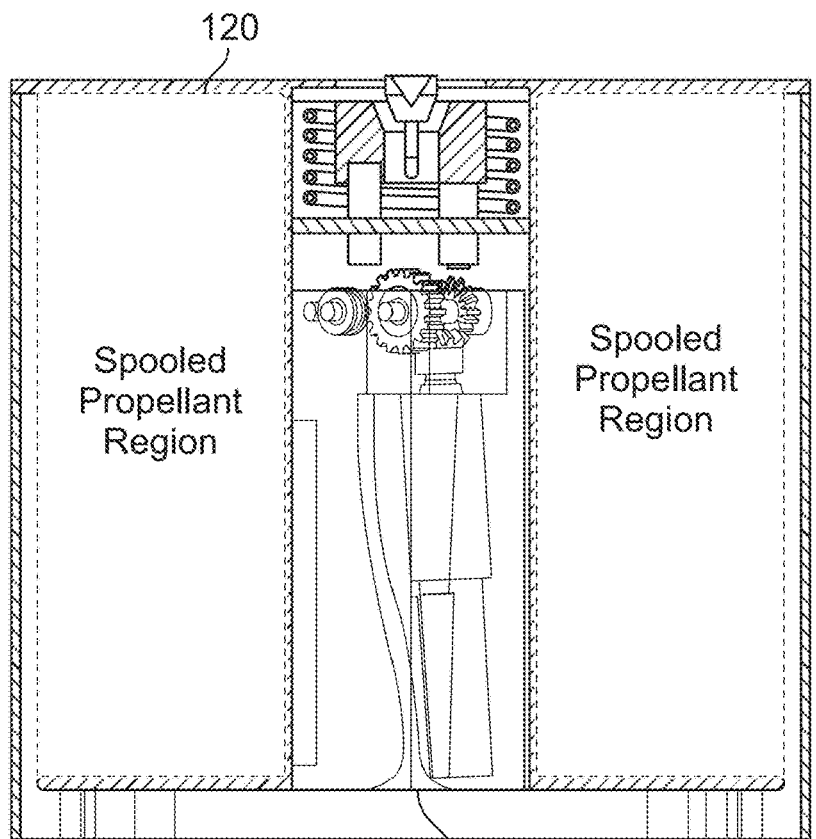
FIG. 18C 1U MVP Thruster
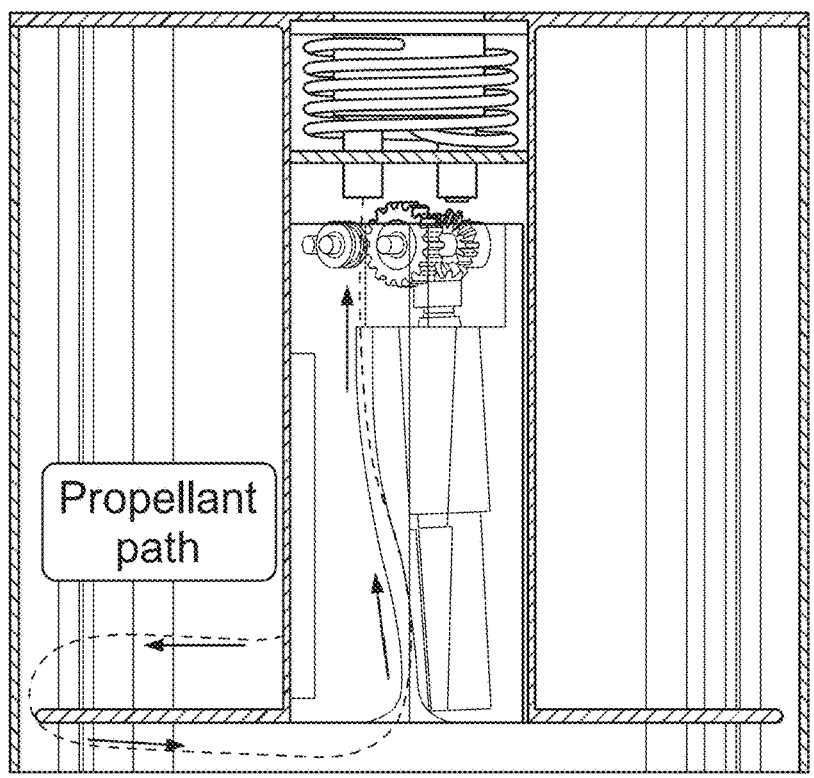
FIG. 18D 1U MVP Thruster

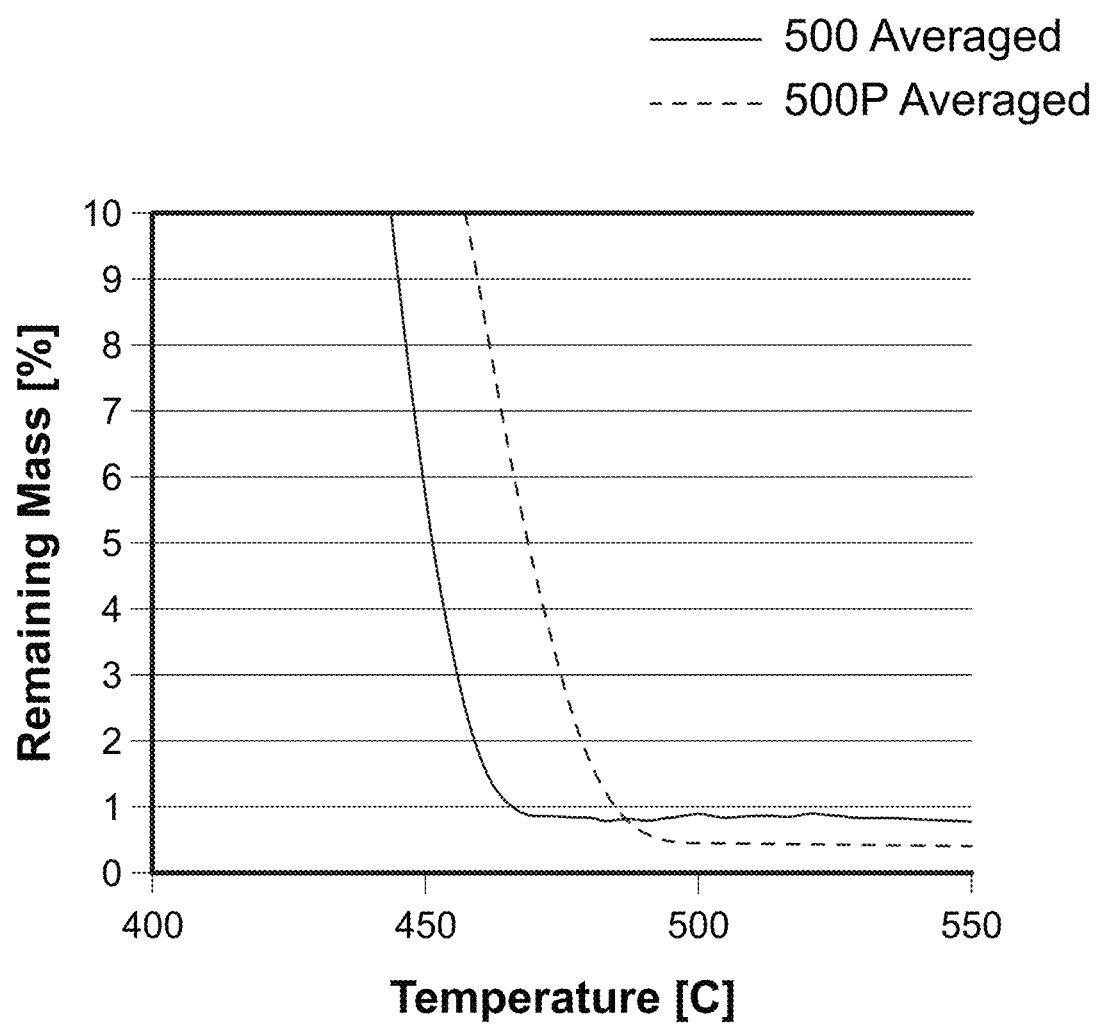
FIG. 20 TGA results for Delrin 500 and 500P

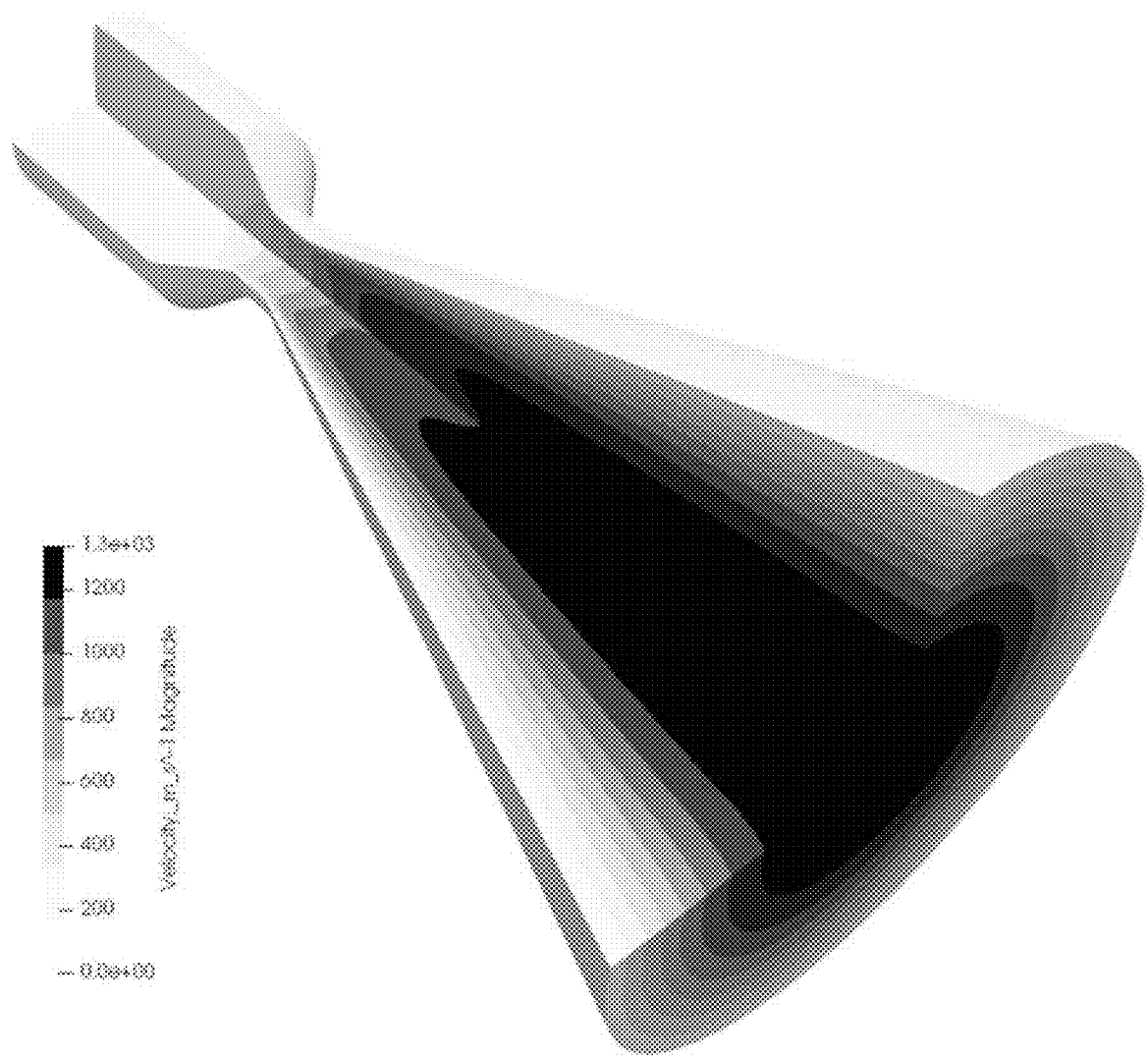
FIGS. 21A. 2D-axisymmetric BLAZE simulation for the MVP experimentally tested nozzle geometry having a 0.0156" diameter throat, 0.1" diameter exit, and 20° nozzle half-angle at a flow rate of 3 mg/s and total temperature of 973 K: surface plots for velocity

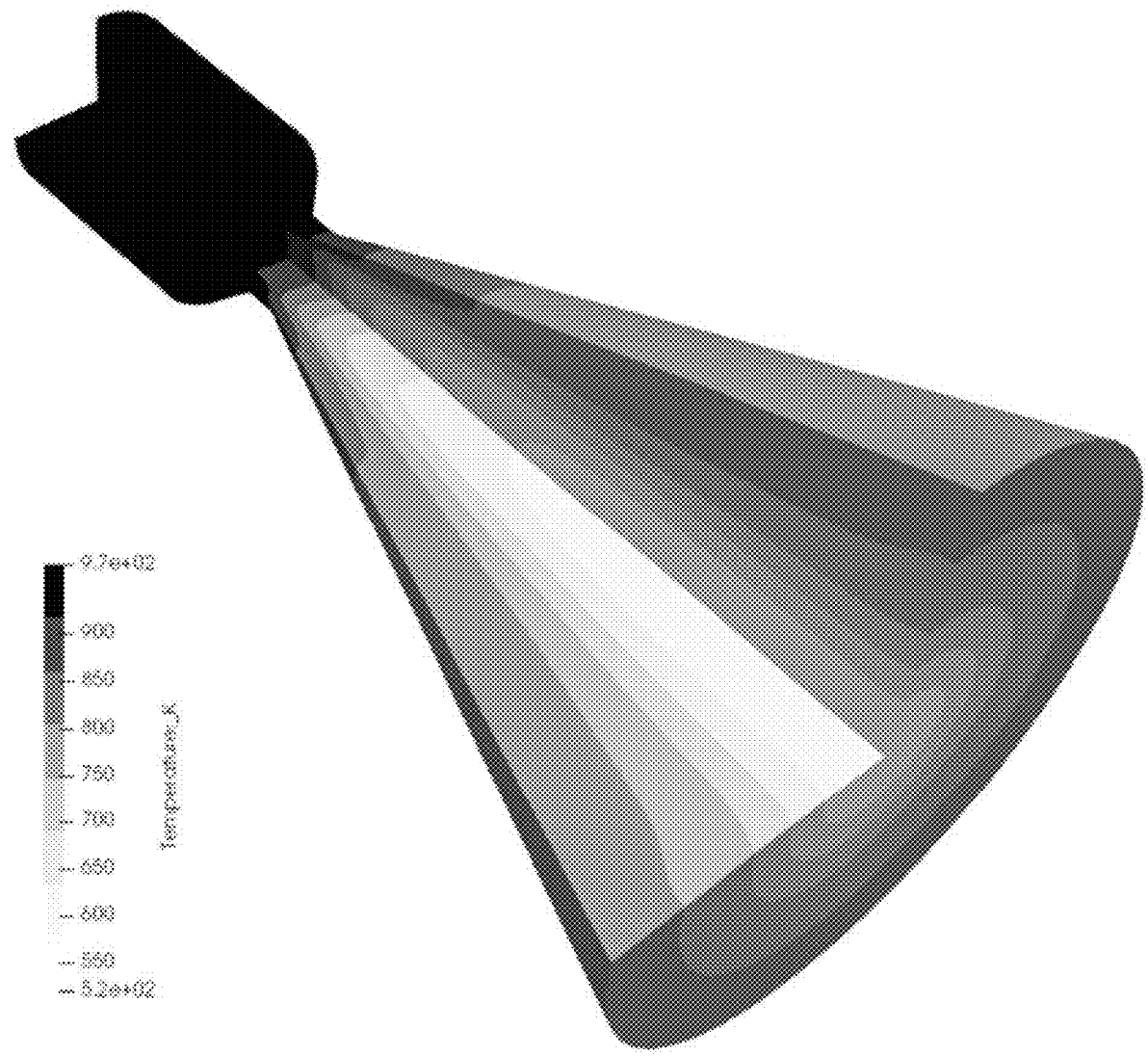
FIGS. 21B. 2D-axisymmetric BLAZE simulation for the MVP experimentally tested nozzle geometry having a 0.0156" diameter throat, 0.1" diameter exit, and 20° nozzle half-angle at a flow rate of 3 mg/s and total temperature of 973 K: surface plots for temperature.

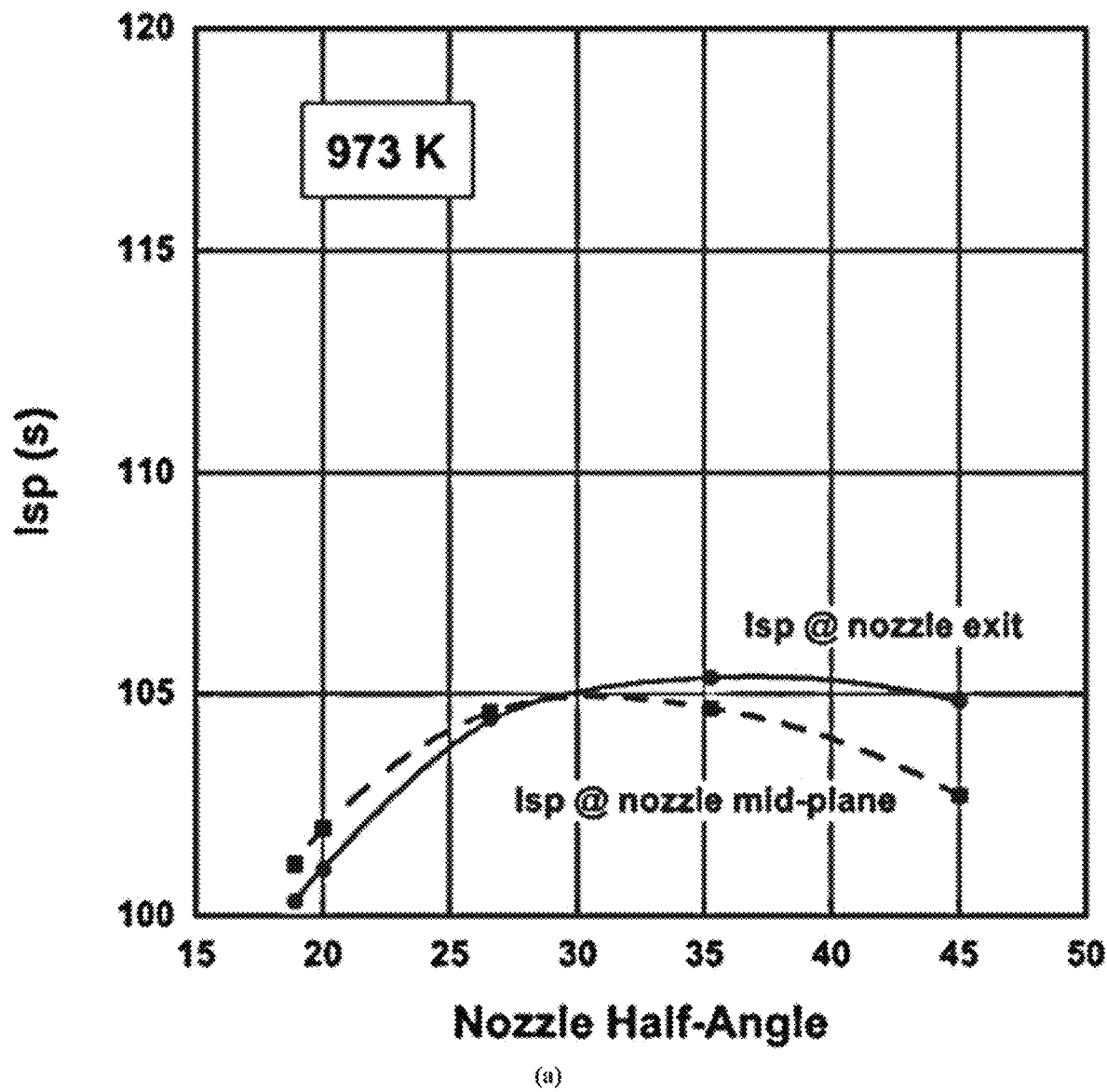
FIGS. 22A. BLAZE predictions of nozzle exit Isp and nozzle mid-plane Isp vs. nozzle half-angle for a total (inlet) temperature of 973 K.

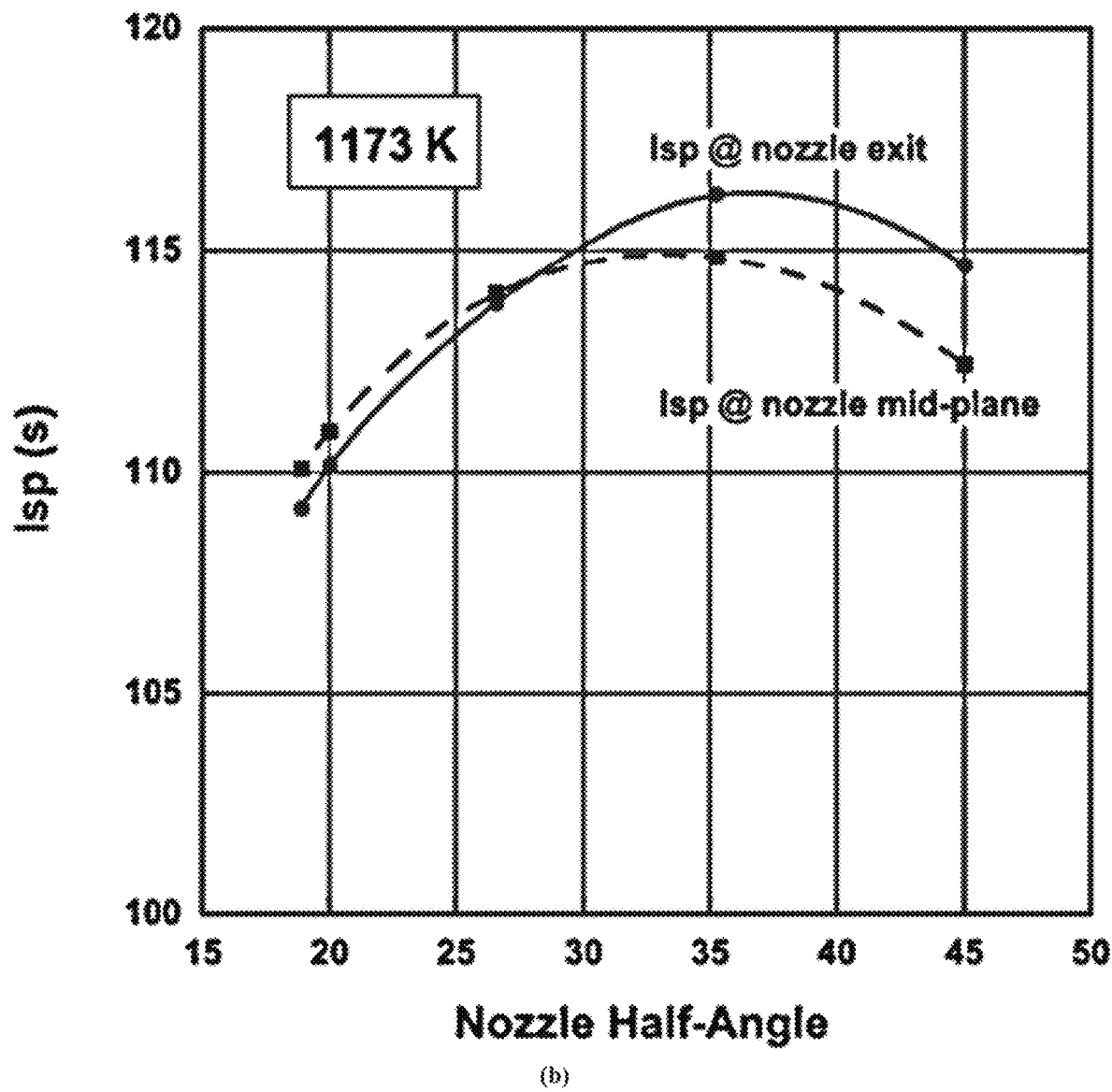
FIG 22B. BLAZE predictions of nozzle exit Isp and nozzle mid-plane Isp vs. nozzle half-angle for a total (inlet) temperature of 1173 K.

BLAZE predictions of nozzle exit Isp vs. nozzle half-angle as a function of total (inlet) temperature

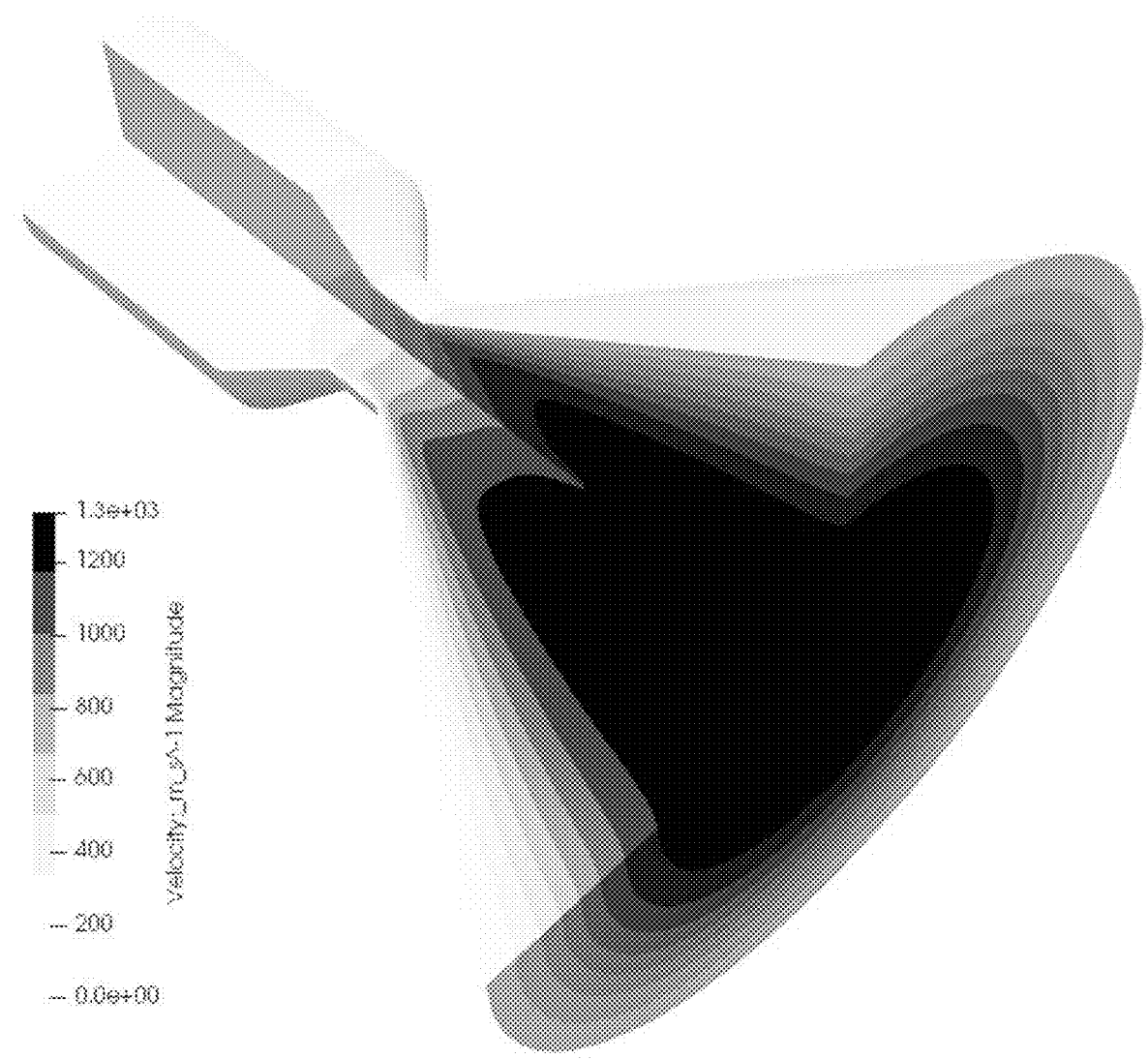
FIG. 24A. 2D-axisymmetric BLAZE simulation for a 35.3° nozzle half-angle at a flow rate of 3 mg/s and total temperature of 973 K: surface plots for velocity.

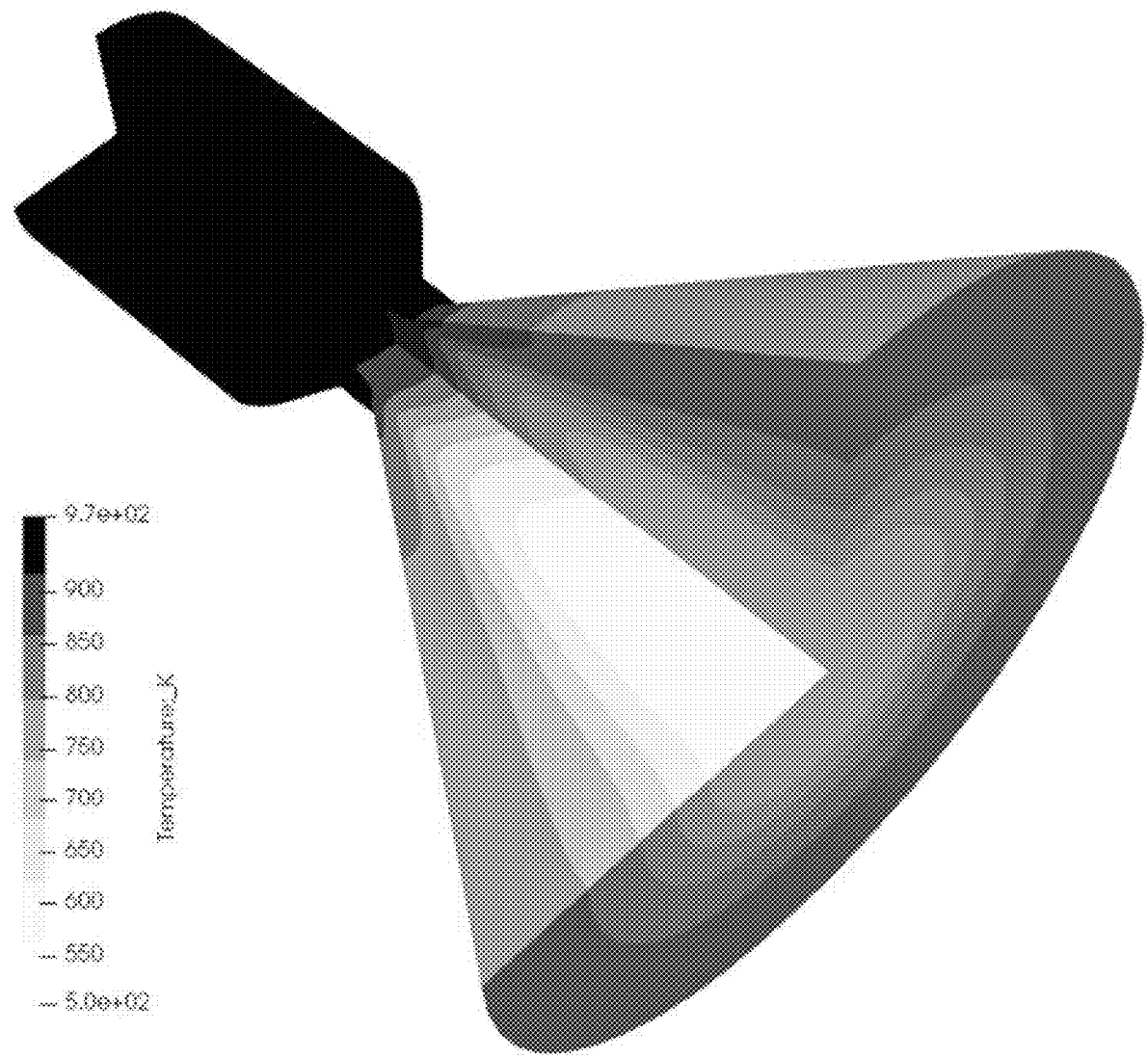
FIG. 24B. 2D-axisymmetric BLAZE simulation for a 35.3° nozzle half-angle at a flow rate of 3 mg/s and total temperature of 973 K: surface plots for temperature.

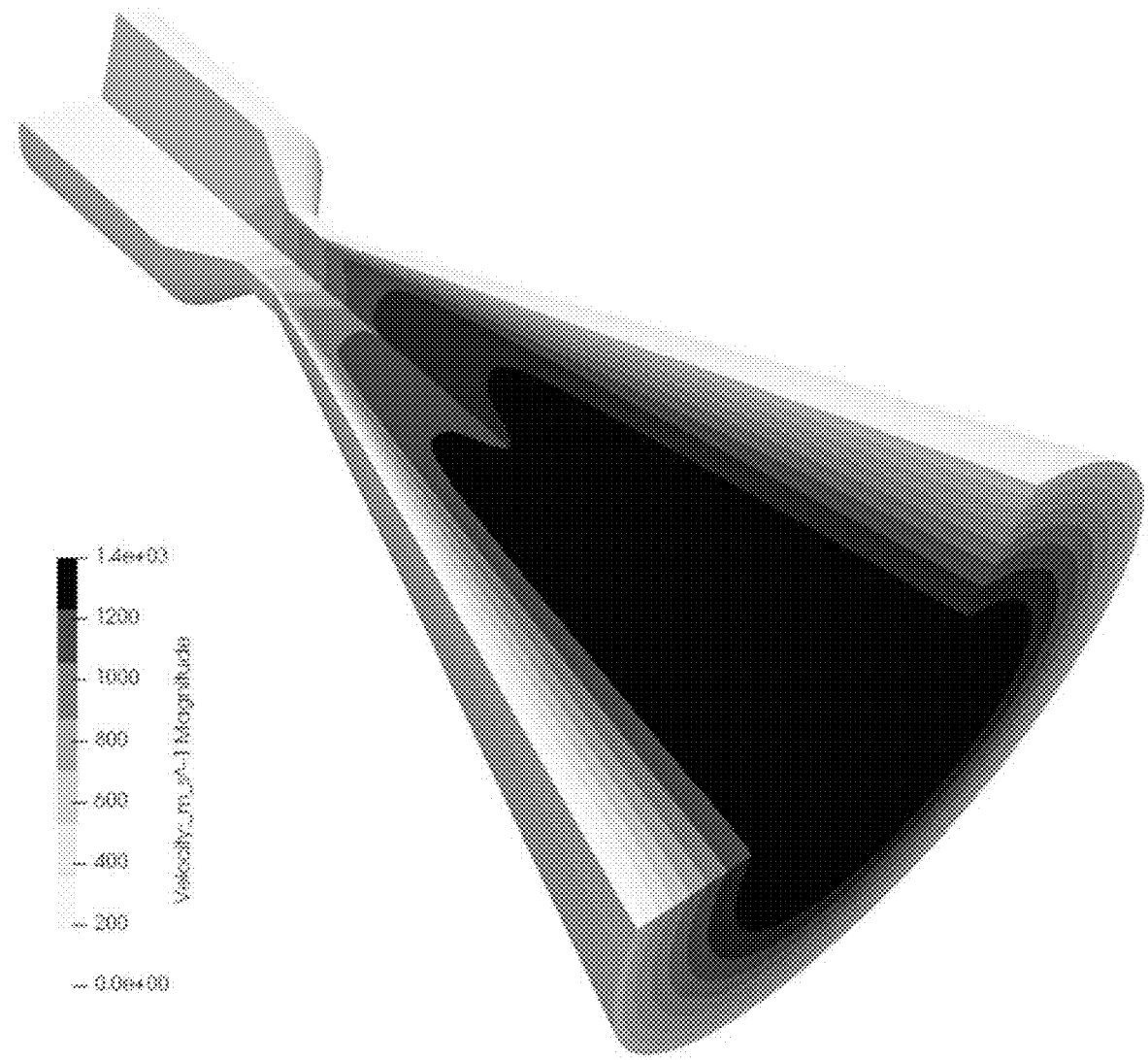
FIG. 25A. 2D-axisymmetric BLAZE simulation for the 0.0156" diameter throat, 0.1" diameter exit, and 20° nozzle half-angle nozzle geometry with a flow rate of 7 mg/s and total temperature of 973 K: surface plots for velocity.

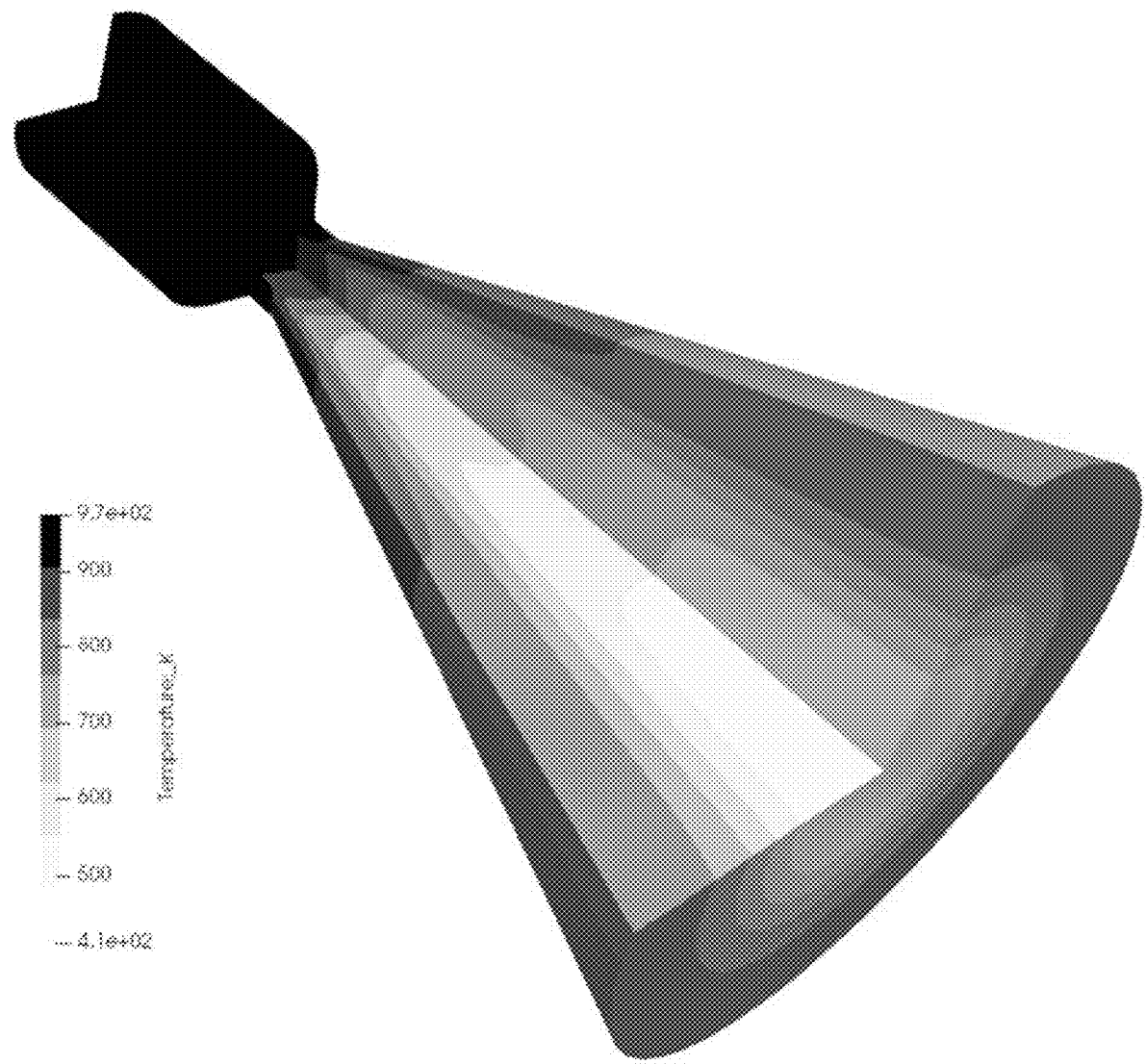
FIG. 25B. 2D-axisymmetric BLAZE simulation for the 0.0156" diameter throat, 0.1" diameter exit, and 20° nozzle half-angle nozzle geometry with a flow rate of 7 mg/s and total temperature of 973 K: surface plots for temperature.

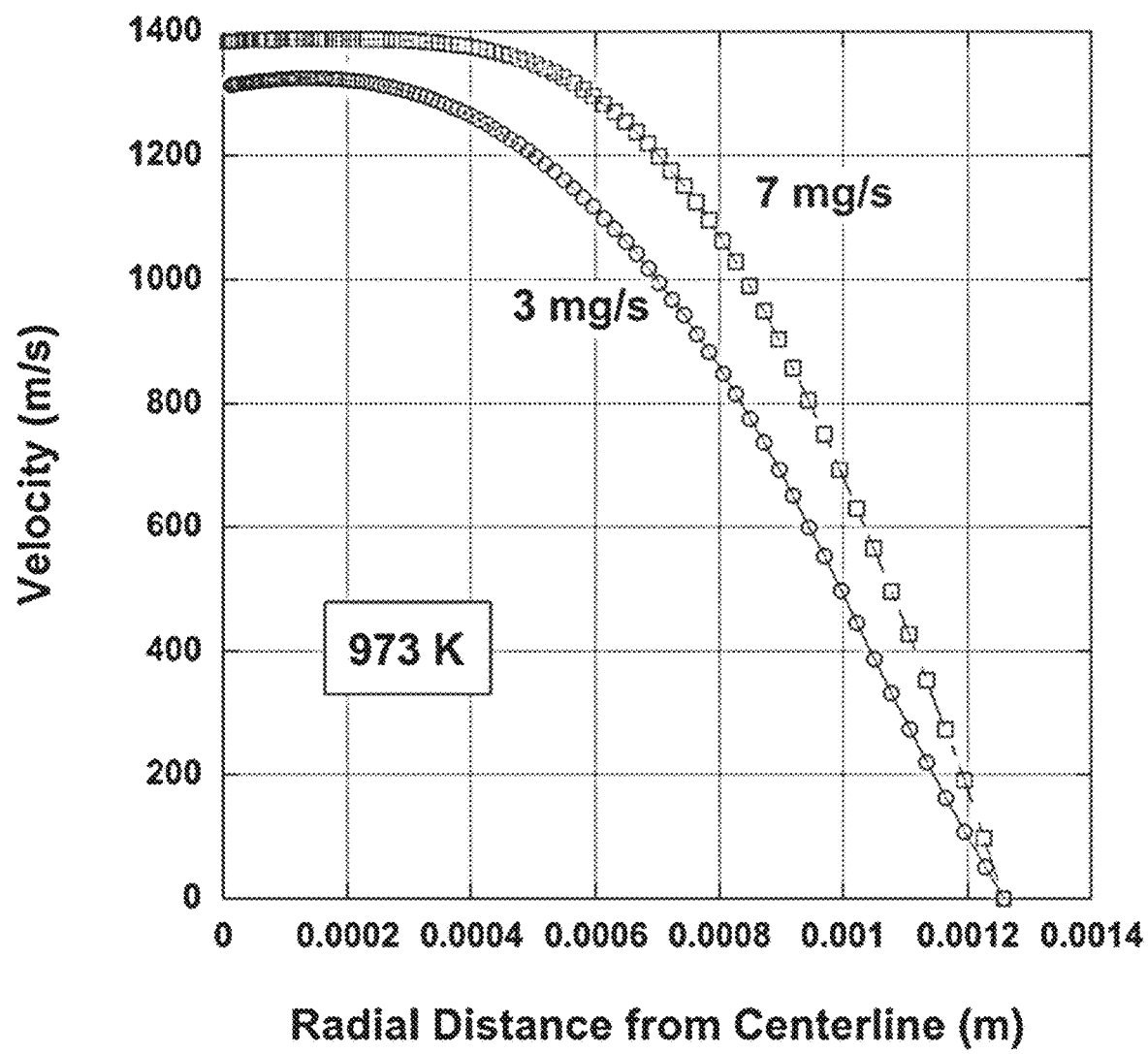
FIG. 26. BLAZE predictions for velocity vs. radial distance from nozzle centerline as a function of flow rate at the nozzle exit plane.

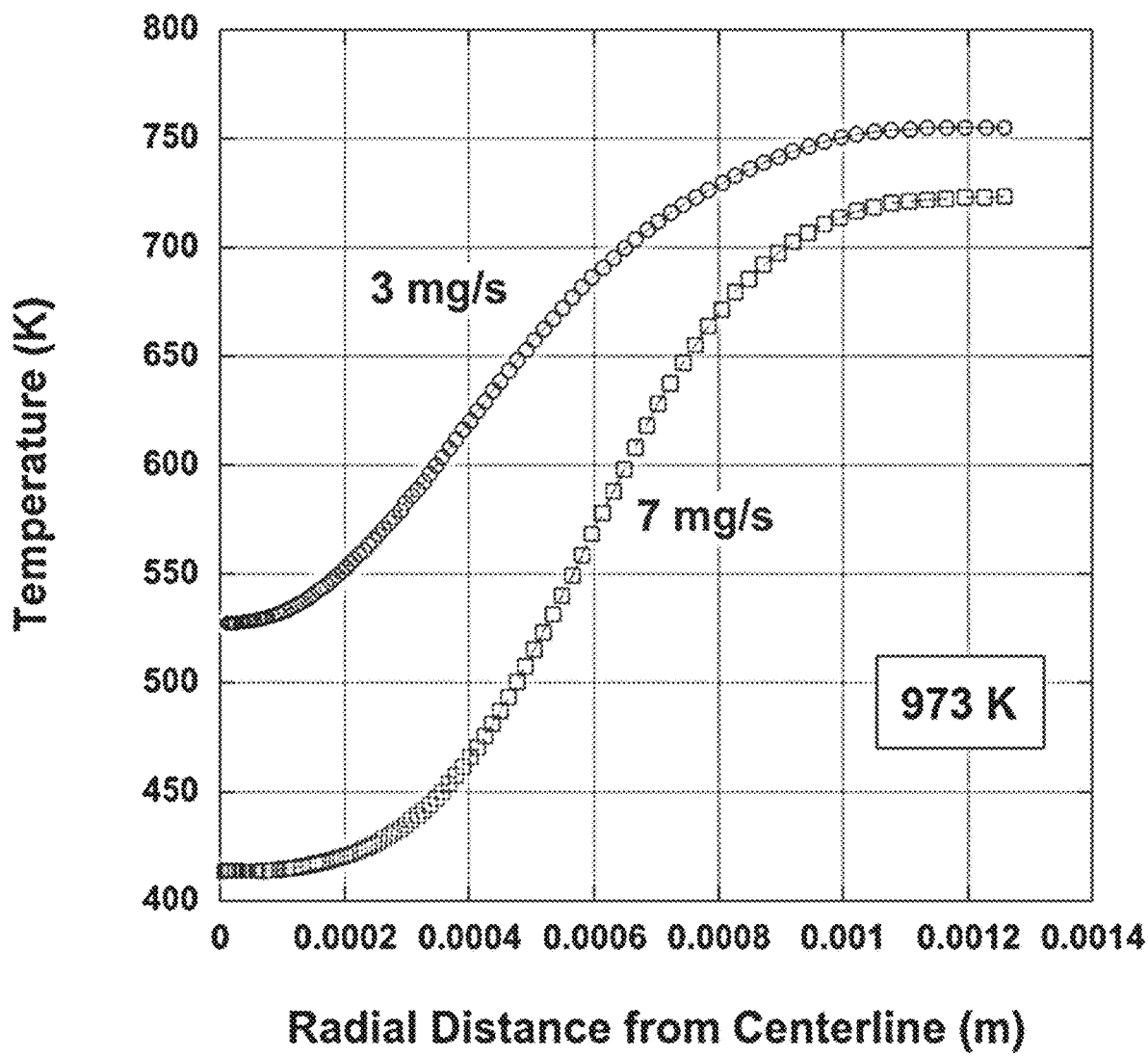
FIG. 27. BLAZE predictions for temperature vs. radial distance from nozzle centerline as a function of flow rate at the nozzle exit plane.

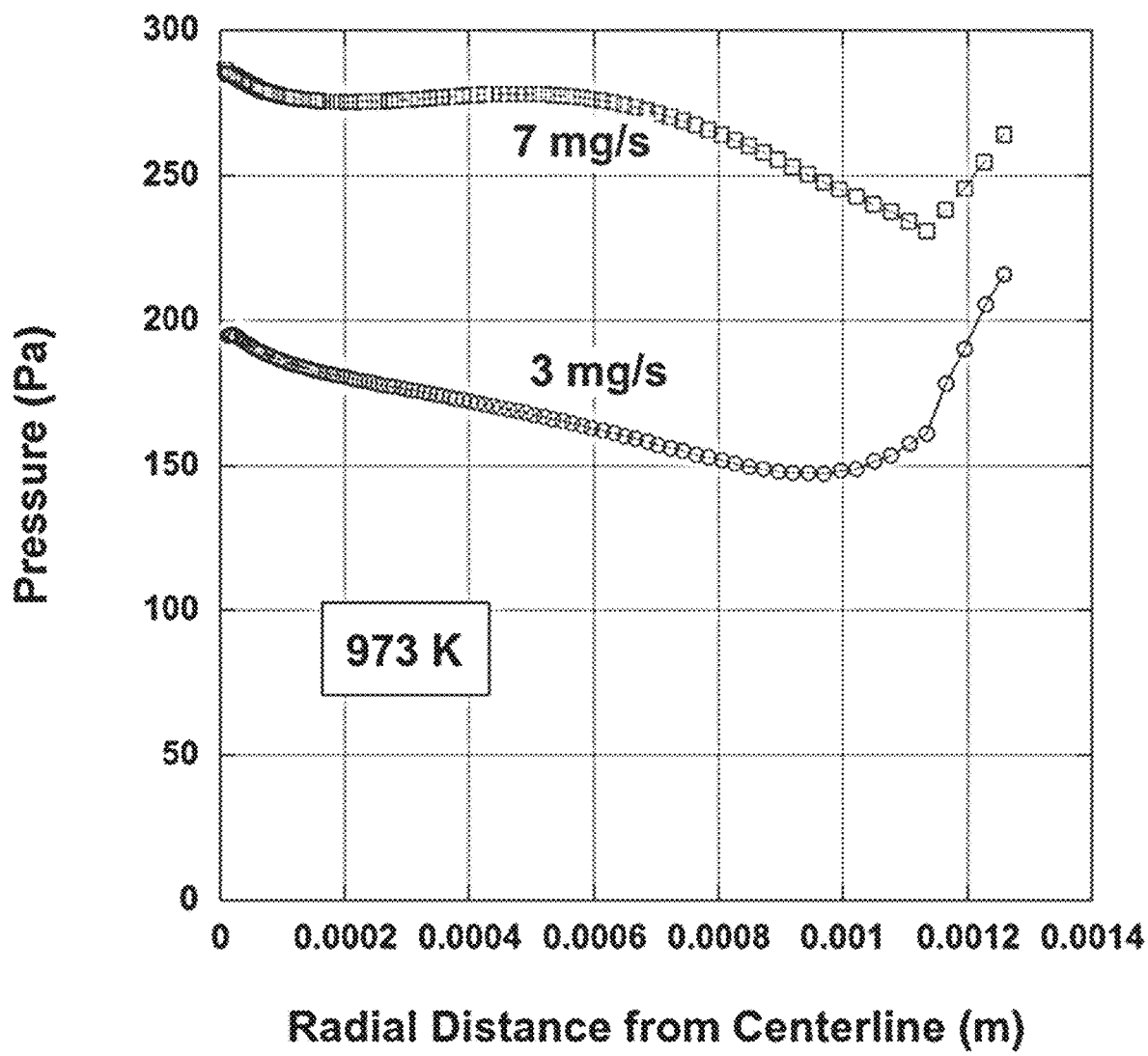
FIG. 28. BLAZE predictions for pressure vs. radial distance from nozzle centerline as a function of flow rate at the nozzle exit plane.

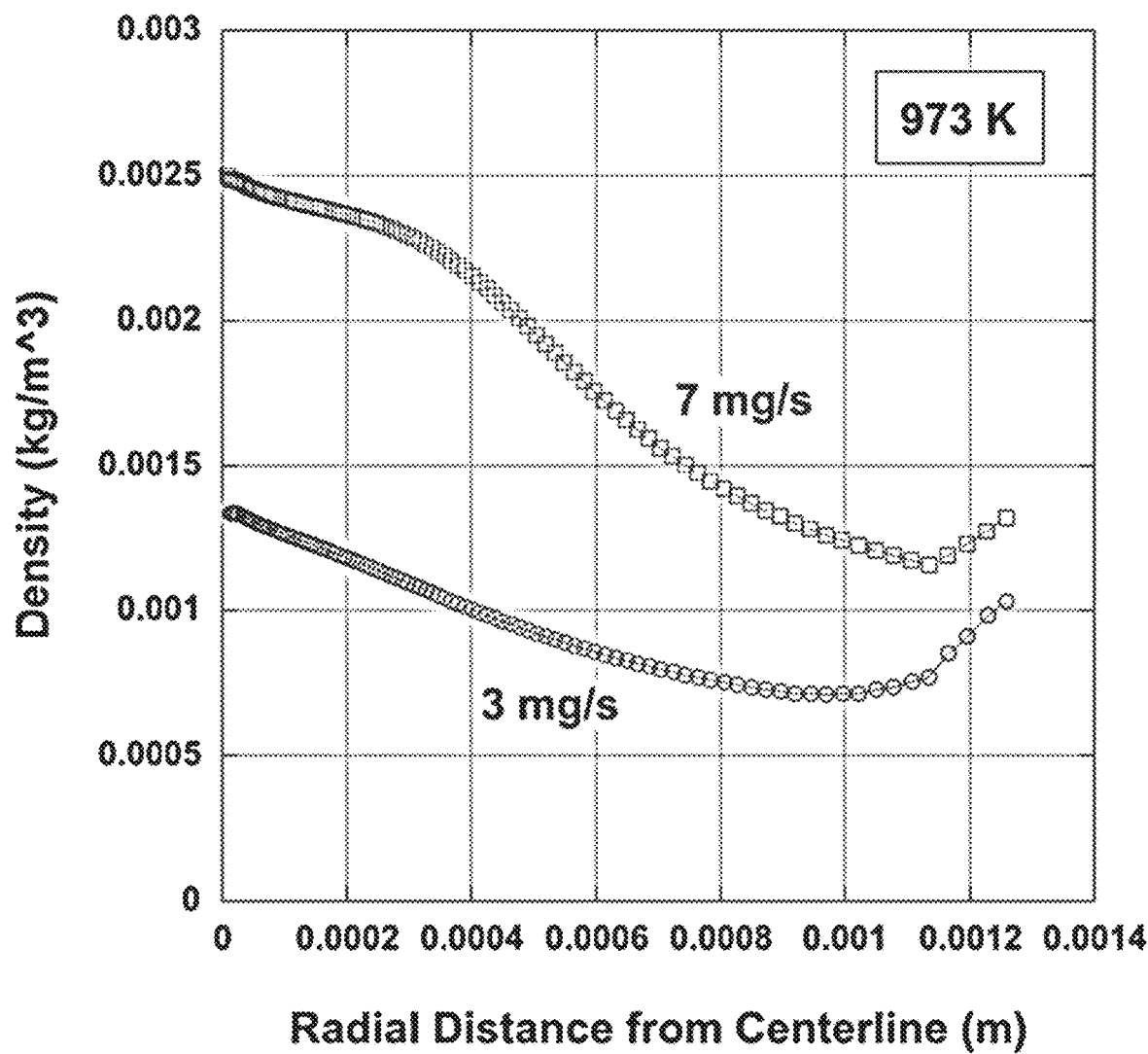
FIG. 29. BLAZE predictions for density vs. radial distance from nozzle centerline as a function of flow rate at the nozzle exit plane.

MONOFILAMENT VAPORIZATION PROPULSION SYSTEMS

CROSS REFERENCE TO RELATED APPLICATIONS

The present application is a nonprovisional application claiming the benefit of U.S. Provisional Application 62/472,702 filed Mar. 17, 2017 and is hereby incorporated herein by reference.

STATEMENT OF GOVERNMENT SUPPORT

This invention was made with government support under NNX16CC70P awarded by NASA. The Government has certain rights in the invention.

BACKGROUND OF THE INVENTION

Monofilament Vaporization Propulsion (MVP) is an innovative new propulsion technology targeted at small- and nano-satellite propulsion applications. The approach with MVP, rather than using exotic propellants to achieve maximum specific impulse and system performance, is to use an inexpensive, inert, low vapor pressure solid propellant. This enables the use of a propulsion system on lower budget missions by lowering the unit cost (no valves or pressure vessels), and minimizes range safety expenses. By using a commercially available, space-rated polymer as propellant, MVP overcomes potential issues associated with liquid propellants such as freezing, over-pressurization, degradation (of tank wall and/or propellant itself), and cg perturbations due to sloshing. As a result, MVP's standalone risk to the primary payload is no greater than that of a CubeSat not equipped with propulsion. MVP harnesses technology used in 3D printing applications to feed propellant into proven electrothermal propulsion technology developed by the Applicant. To date, MVP has demonstrated a continuous 105 seconds specific impulse with 20 W input power, with 107 seconds peak, with expectations of further performance improvements exceeding 130 seconds. This should provide 900 N-s total impulse with a 1U (10 cm×10 cm×10 cm) system, attributable to the high storage density and permissible low mass of the fuel storage subsystem. A 4 kg, 3U CubeSat equipped with MVP could achieve 250 m/s $\Delta V$ while consuming less than 25 W during operation.

The MVP thruster system supports the NASA Roadmap for In-Space Propulsion Systems, nonchemical propulsion. MVP offers CubeSats and other small satellites a propulsion capability sufficient for various orbital maneuvers with several millinewtons of thrust requiring minimal thrust-control attitude control system (ACS) and a minimal volume and system integration cost. The baseline MVP, occupying a 1U volume, has a minimal integration impact on the CubeSat bus and payload. The solid propellant has no handling, storage, or operational restrictions beyond those of the CubeSat. The ease of handling and storage for the solid propellant can extend operation to planetary missions with no additional monitoring or controls.

The MVP thruster will provide a compact, light-weight, non-hazardous, propulsion technology solution that will be made available in a family of sizes that can meet the differing needs of users in DOD, industry, and academia for CubeSat and small-satellite missions. MVP will require no safety equipment for storage, transportation, integration, and testing, and places no demanding requirements on the launch provider, making it an ideal low-cost solution for industry, research, and academic small-satellite propulsion needs.

SUMMARY OF THE INVENTION

The MVP thruster system utilizes an innovative combination of technologies (3D printing and resistojet for decomposable propellants) to enable a simple solid polymer fiber, used as a propellant, to be fed, evaporated, and expanded through a standard supersonic nozzle for in-space propulsion. The technology is compact, inherently safe, and is extendable to a broad range of space applications.

Numerous other advantages and features of the invention will become readily apparent from the following detailed description of the invention and the embodiments thereof, from the claims, and from the accompanying drawings.

BRIEF DESCRIPTION OF THE FIGURES

A fuller understanding of the foregoing may be had by reference to the accompanying drawings, wherein:

FIG. 1 is a perspective photo of an MVP baseline system in accordance with one or more embodiments of the invention;

FIG. 2 is a block diagram of an MVP baseline system in accordance with one or more embodiments of the invention;

FIG. 3 is a diagram of $\Delta V$ for a 4 kg satellite vs propulsion system volume for various electric propulsion systems;

FIG. 4 is a diagram of phase change for the propellant through the MVP system;

FIG. 5 is a side view of an MVP system design for a breadboard apparatus;

FIG. 6 is an MVP system designed with a 30 cm coiled superheater tube;

FIG. 8 is an MVP system breadboard in a clear acrylic vacuum tank;

FIG. 9 is an MVP system breadboard ready for testing on a trust stand;

FIG. 10 is a two stage superheater tube with a coiled section;

FIG. 11 is a depiction of radiation modeling of superheater tubes;

FIG. 12 shows two-stage superheater operation with flowing propellant (flowing left to right);

FIG. 17 are figures showing the MVP system fiber feed testing;

FIG. 18A is a perspective component view of an MVP system in accordance with one embodiment of the present invention;

FIG. 18B is a partial exploded component view of an MVP system in accordance with one embodiment of the present invention;

FIG. 18C is a perspective component view of an MVP system in accordance with one embodiment of the present invention;

FIG. 18D is a perspective component view of an MVP system in accordance with one embodiment of the present invention;

FIG. 20 is the TGA results for Delrin 500 and 500P;

FIGS. 21A and 21B are BLAZE simulations for a nozzle geometry having a 0.0156 inch diameter throat, 0.1 diameter exit, and 20 degree nozzle half-angle at a flow rate of 3 mg/s and a total temperature of 973 K; figures showing surface plots for velocity and temperature;

FIGS. 22A and 22B are BLAZE predictions of nozzle exit Isp and nozzle mid-plane Isp vs nozzle half-angle for a total (inlet) temperature of 973 K and 1173 K;

FIGS. 24A and 24B illustrate a 2D axisymmetric Blaze simulation for a 35.3 degree nozzle half-angle at a flow rate of 3 mg/s and total temperature of 973 K, with surface plots for velocity and temperature;

FIGS. 25A and 25B illustrate a 2D-axisymmetric BLAZE simulation for the 0.0156" diameter throat, 0.1" diameter exit, and 20° nozzle half-angle nozzle geometry with a flow rate of 7 mg/s and total temperature of 973 K, with surface plots for (a) velocity and (b) temperature FIG. 26 illustrates BLAZE predictions for velocity vs. radial distance from nozzle centerline as a function of flow rate at the nozzle exit plane;

FIG. 27 illustrates BLAZE predictions for temperature vs. radial distance from nozzle centerline as a function of flow rate at the nozzle exit plane;

FIG. 28 illustrates BLAZE predictions for pressure vs. radial distance from nozzle centerline as a function of flow rate at the nozzle exit plane; and FIG. 29 illustrates BLAZE predictions for density vs. radial distance from nozzle centerline as a function of flow rate at the nozzle exit plane.

DETAILED DESCRIPTION OF THE INVENTION

Figure 7A:
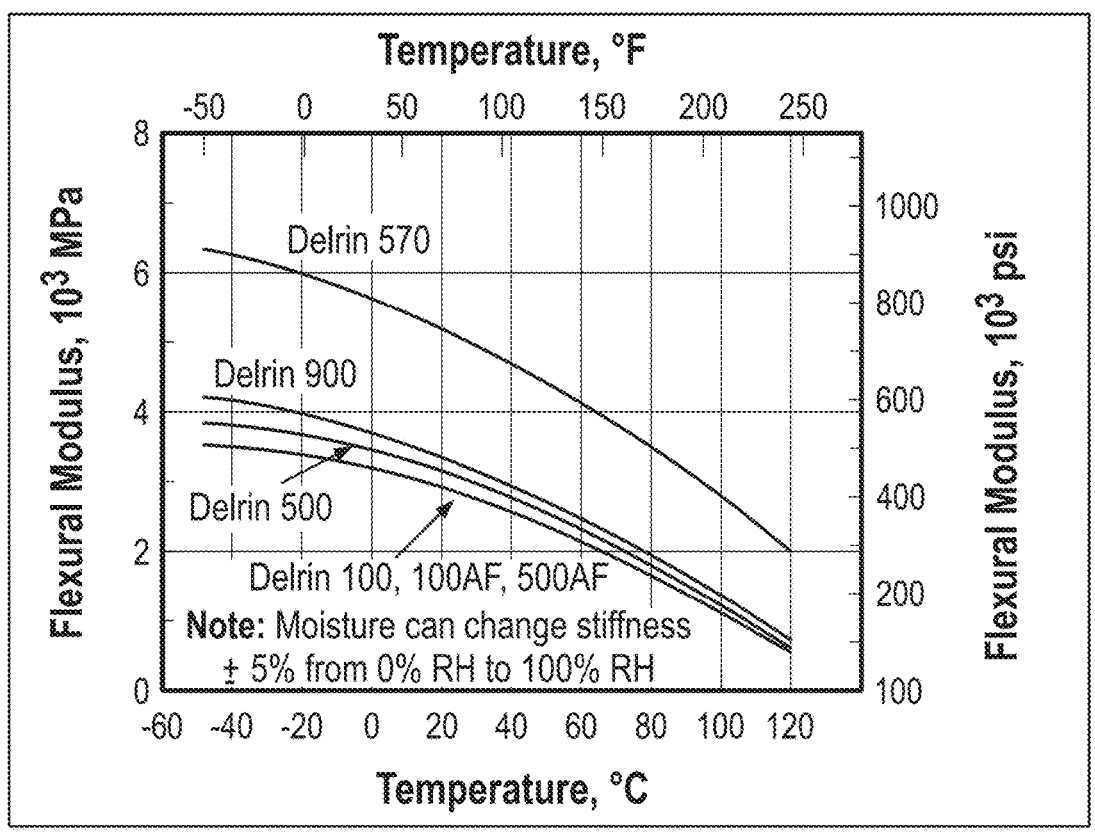
FIG. 7 are two temperature charts dependent on properties of Delrin.

In very small satellites such as CubeSats, volume is at a premium, favoring a propulsion system that not only occupies minimal payload and bus volume, but avoids use of toxic propellants such as ammonia and hydrazine (frequently used to achieve high performance, but which significantly complicate storage, handling, and launch of the satellite). The Applicant, CU Aerospace (CUA), has developed an innovative new thruster technology to technology readiness level (TRL) 4 that utilizes a high density, nontoxic, inert solid propellant. Stored as fiber and fed using technology proven in 3D printing applications, MVP utilizes polyoxymethylene (acetal resin or POM) as its baseline propellant. These enable very long-term storage, a temperature envelope comparable to a typical satellite's onboard electronics, and a competitive ΔV performance with no significant hazards. The baseline MVP system (FIG. 1) occupies a 1-liter or 1-unit (1U) volume and consumes 25 W of power while providing a ΔV of 250 m/s for a 4 kg satellite.

While the CubeSat propulsion package size can vary, the MVP program focuses on delivering to NASA an MVP flight unit thruster system that meets desired performance levels from a thruster system accommodating a 1U form factor. Simultaneously, MVP offers simple integration requirements with minimal storage and handling considerations. This is all achieved using coiled fiber propellant storage, a mechanical fiber feed, a temperature controlled extrusion head for melting propellant, a high powered micro-resistojet superheater to volatilize the propellant, and a nozzle to facilitate the expansion of the exhaust gas.

The fiber feed and extrusion implementations draw from 3D printing technology. The superheater is adapted from technology developed for CUA's CubeSat High Impulse Propulsion System (CHIPS). This resistojet heats R236fa (or R134a) with 30 W of power for CHIPS, and a variant is used to fully evaporate the polymer and heat the resulting vapor in the MVP system. A block diagram of the MVP thruster is shown in FIG. 2.

While the risks of a mechanical feed system are readily apparent, MVP trades these for the technical risks of potentially hazardous liquid propellants under pressure. The low cost, high performance system and its benign failure modes make a mechanical feed system an acceptable risk. Feed demonstrations have already minimized the risk of a feed system failure, and tasks within the present development aim to mitigate it entirely.

Comparison with State-of-the-Art (SOA)

Nanosatellite Thruster Choices: An important question for nanosatellites is: what range of efficiency and specific impulse are appropriate for a nanosat electric micropropulsion system? It has been previously shown that for LEO nanosats, the orbit transfer time is optimized at a specific impulse of 70-400 s. Unlike very low power ion and Hall thrusters, which incur a large efficiency penalty from ionization and neutralizers, electrothermal thrusters can operate at high efficiency at low $I_{sp}$, since low power electrothermal thrusters have no inherent requirement for ionized propellant. The conclusion from the previous analysis is that the best specific impulse range for nanosats is relatively low, in a range favoring electrothermal thrusters.

State-of-the-Art CubeSat Propulsion Systems:

A variety of CubeSat propulsion systems are advertised as available today, though very few are actually fully functional, deliverable units. FIG. 3 compares ΔV performance with other leading small satellite propulsion systems implemented on a 4 kg satellite. As shown, the MVP thruster surpasses the performance of the electrospray, electrothermal and cold gas systems. Not shown are the emerging CubeSat chemical monopropellant thrusters. Their performance could exceed all the units shown here including MVP, but their high cost and complexity also limit their application. For now, they still lag in performance due to lower propellant volume utilization (see Table 1). Table 1 provides a list of systems that are the most mature and compares how the different systems perform based upon the metric of "Impulse Density" (or "Volumetric Impulse.") Impulse Density is approximately the total impulse for a 1U system, and indicates the scaling potential. Since MVP shows a competitive impulse density, utilizes a completely non-toxic green inert solid fiber propellant (POM), and has no liquids with corresponding expensive valving, CUA estimates that MVP will have very high customer cost value in terms of total impulse density per unit cost.

TABLE 1

Most mature, state-of-the-art CubeSat propulsion systems as of 2017.

| Manufacturer | Model | Propellant | Impulse Density [N-s/liter] | Comments |
|---|---|---|---|---|
| Aerojet | MPS-120 | $N_2H_4$ (toxic) | ≈550 | Potential waste heat issues, Hydrazine, toxic, TRL 6-7 |
| Busek | MRJ | $NH_3$ (low-toxicity) | ≈250 | TRL 6, low-toxicity |
| Busek | Electrospray | Ionic | ≈675 | Low thrust (100 micro-N), TRL 5 |
| Busek | AMAC | AF-M315E | ≈505 | Potential waste heat issues, High warmup power, TRL 5 |
| Clyde Space | PPT | Teflon | 146 | Very low thrust, micro-N, 0.25 U system only |
| CU Aerospace/ VACCO | PUC | $SO_2$ (low-toxicity) | 526 | 8 flight units delivered (0.25 U), TRL 7, low-toxicity |
| CU Aerospace/ VACCO | CHIPS | R134a/ R236fa | 525 | ACS included, green propellant. Prototype in fabrication, TRL 5 |
| CU Aerospace | MVP | POM | ~900 | Solid fiber, green propellant. No pressure vessel, TRL 4 |
| VACCO | MEPSI MiPS | $C_4H_{10}$ | 114 | Cold gas only, TRL 7 |
| VACCO | CPOD | R134a | 135 | Cold gas only, TRL 6 |
| VACCO | ADN | ADN | ~600 | Potential waste heat issues, High warmup power, TRL = 5-6 |

* Impulse Density (or Volumetric Impulse) = total impulse of the system divided by the volume of the propulsion system [Newton-seconds/liter]. For 1 U systems, this number is approximately the total impulse. Some values from prior art references.

Summary of Results

During early development, a breadboard test unit was fabricated that allowed for various configurations of the superheater, feed barrel, and nozzle to be tested. Two candidate propellants were assessed, and the best performer (POM) and corresponding hardware configuration was thrust stand tested. The system to date has a peak specific impulse of 107 s at a thrust level of 3.4 mN. A mockup 1U structure was designed and fabricated to identify the necessary tolerances for reliable fiber storage and feed. A solid model incorporating the lessons learned from the breadboard test unit and 1U mockup was developed as a starting point for the flight design.

Design and Fabricate MVP Breadboard Test Unit

Functional Description of MVP Breadboard System

To validate MVP, three major components were required: feed system, extrusion head, and superheater with expansion nozzle. The feed system and extrusion head are technologies transferred from extrusion 3D printing. While some miniaturization is required for a flight like system, this is a mature technology. Melted propellant leaves the extrusion head and flows directly into the attached superheater, an innovative micro-resistojet technology originally developed by CUA for the CubeSat High Impulse Propulsion System (CHIPS) warm gas R26fa/R134a thruster. The superheater employs a very small diameter thin-walled tube which acts as a resistive heating element. For CHIPS, the resistojet heats the propellant, R236fa/R134a, to approximately 600° C. While the CHIPS thruster is originally designed to operate with gaseous propellant, the environment within the micro-resistojet superheater tube, with high surface area, temperature, and pressures (depending on nozzle design), was expected to perform well with the two-phase molten propellant. Shown in FIG. 4 is a diagram describing the phase transition of the propellant throughout the system.

The apparatus shown in FIG. 5 is the first iteration of the breadboard. This incorporates a cartridge heater and a small thermistor to regulate the heat of an aluminum block through which the propellant passes. A thermal gradient is created at the propellant entrance (far left) by a PTFE lined, Torlon barrel. Within the barrel, the propellant transitions from solid to liquid. With the PTFE liner and POM propellant, this component performed reliably throughout the early development program. Present efforts have replaced the Torlon with a thin walled stainless steel, and this also performs reliably.

Downstream of the heated block, the superheater evaporates the propellant, which expands through a supersonic nozzle. Note that the mechanical feed shown was an off-the-shelf 3D printer setup. While conceptual development of the scaled down feed system was completed in early development, it was deemed more important to address the risks of the hardware shown in FIG. 5 than construct the flight-like feed.

Improvements to the apparatus shown in FIG. 5 were incremental throughout the program. Early on, it was discovered that a longer superheater tube was required for the complete evaporation of the propellant. A coiled tube geometry was implemented to allow longer lengths. Another change was the addition of a heated nozzle. This feature guarantees the ability to restart the thruster after operation, even if some propellant condenses in the nozzle. In the flight design, the nozzle and upstream heater block are thermally coupled. This would complicate the assembly of the breadboard, so separate heaters are used. The apparatus with coiled superheater and heated nozzle is shown in FIG. 6.

Polymer Propellant Selection

Polymers best suited for the MVP thruster should decompose into vapors without leaving residue or char behind. The gaseous products should have a low molecular weight, and the polymer should require as little energy as possible to depolymerize and evaporate.

The leading candidate is polyoxymethylene (POM), which is also known as acetal resin or by the trade name Delrin. This material is a common engineering thermoplastic and has a history of use in spacecraft applications. Under high heat it decomposes into its monomer, formaldehyde ($CH_2O$). Given the polymer's melting point of 166° C., the toxic gaseous product cannot be produced under normal conditions (when MVP is turned off). The high vapor pressure of $CH_2O$ means that a POM-fed MVP system can operate in a pure gas state rather than a saturated vapor state, allowing for a wide range of operating conditions and minimizing the chances of clogging or sputtering.

Figure 7B:
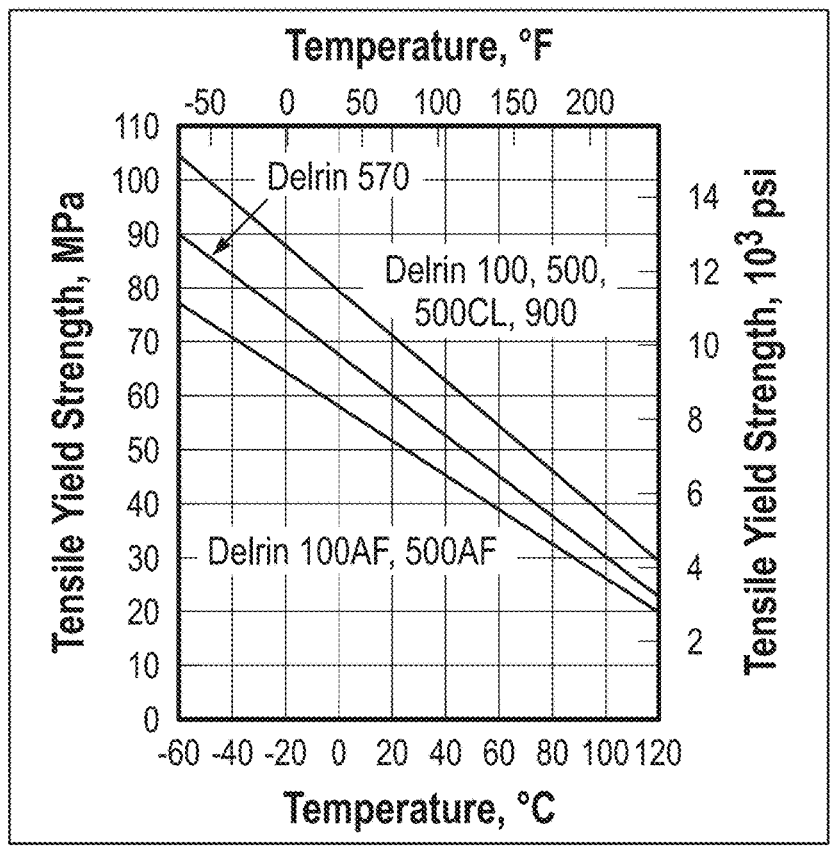

The material currently in use, Delrin 500, is expected to perform well over a wide temperature range. FIG. 7 below, taken from a Delrin design guide [Dupont Engineering Polymers], shows the yield strength and flexural modulus of various POM formulations, including Delrin 500, over a large temperature range. Assuming an operating temperature of 0° C. to 60° C., the material stiffness, indicated by the flexural modulus, is largely unchanged. The reduction in tensile strength from room temperature is less than 30% at 60° C. and is not an issue.

Other polymers under consideration include polyethylene, nylon, and PLA. When polyethylene undergoes pyrolysis, it leaves no solid residue, and creates hydrocarbon molecules such as propane, propene, ethane, methane, butene, hexane-1, and butene-1. These are all of low molecular weights, but since the composition of the gaseous product varies with heating rates, it is difficult to make performance predictions with this propellant. The other candidate polymer, PLA, evaporates and produces molecules of lactide exclusively from the addition of a catalyst in the fiber. CUA markets a doped-variant of this material under the name VascTech™. Unfortunately, the lactide molecule produced by VascTech™ has a high molecular weight (144 g/mol). Information on the pyrolysis of lactide was not found, but in the event the molecule decomposes in the high heat of the superheater a performance in line with POM could be achieved. Decomposition of $CH_2O$ (from POM propellant) is possible at the anticipated operating conditions, but has not been well-quantified at this time.

The breadboard uses 1.75 mm fibers as they are a commercially available diameter for 3D printer filaments and can be coiled on a spool. Smaller and larger sizes are under consideration for the flight design; however, the packing efficiency, tensile strength, and availability of the 1.75 mm fibers makes them a promising choice. POM has a density of 1.4 g/cc, and despite sources indicating a packing efficiency of $\pi/4$ for spooled wire and cable (NEMA WC 26), lab tests showed packing efficiencies approaching that of a hexagonal, close packed structure (91%). POM remains competitive with liquid propellants with the resulting 1.27 g/cc storage density.

MVP Breadboard Testing

Lab testing of shorter superheater tubes (10 cm and 20 cm) with the apparatus shown in FIG. 5 resulted in incomplete evaporation, although the 20 cm tube performed much better than the 10 cm tube. Given these results, a 30 cm coiled tube was constructed for lab testing, FIG. 8. The coiled tube is of higher wall thickness than previous tubes used as this makes the bending process much easier. Since the tube length is significantly longer than before, the DC resistance of the tube is equivalent to the 5 cm variant used in CHIPS (~1 ohm). This 30 cm tube fully evaporated the POM and performed well enough for more thorough testing.

The 30 cm device was validated in an acrylic vacuum tank before thrust stand testing as shown in FIG. 8. Note the discoloration on the black plastic witness plate. This is the result of heat damage and/or the exhaust condensing on the plate. Aside from this location, which is directly in the path of the nozzle, the rest of the tank showed no clouding of the walls after 30 minutes of continuous operation.

After this validation, the breadboard apparatus was upgraded for use on the thrust stand. A power board produced in the NASA SBIR Phase I CHIPS program was repurposed to run the superheater and control the heater blocks while on the stand. This board is powered with 24V and has a battery to supplement its power when on the thrust stand. The current requirements for the superheater and cartridge heaters necessitated the use of the CHIPS Support Board (CSB) rather than the feedthroughs to the thrust stand. The feed motor, however, is powered directly through the stand connections. FIG. 9 shows the breadboard including the CSB (minus battery) mounted and ready for the thrust stand. The large plastic cylinder in the upper left of the photograph is rigidly mounted and is wrapped with PTFE tubing. The MVP thruster pulls the filament out of this spiral. This implementation was chosen specifically to eliminate any shifting or jostling of the propellant while on the thrust stand. The performance of this hardware iteration was lower than anticipated, although the general operation of startup and shutdown went well. Table 2 summarizes this first round of thrust stand testing.

TABLE 2

Single-stage 30-cm coiled superheater tube results, POM propellant

| Power (W) | mdot (mg/s) | P/mdot (J/mg) | Thrust (mN) | Isp (s) |
|---|---|---|---|---|
| 30 | 2.41 | 12.4 | 1.49 | 63 |
| 35 | 2.41 | 14.5 | 1.63 | 69 |
| 40 | 2.43 | 16.5 | 1.61 | 67 |
| 40 | 3.43 | 11.7 | 2.04 | 61 |

While there is still the possibility of incomplete polymer decomposition, the primary losses responsible for this performance are believed to be viscous losses in the nozzle, radiation losses, and even convective losses due to the vacuum quality.

To help overcome radiation losses, a two-stage superheater tube was developed. By placing a short, equal resistance, thin-walled tube in series with the coiled tube, FIG. 10, the thin walled tube receives half the electrical power. This limits the maximum temperature of the coil (which has much higher surface area) and the resulting radiative losses.

FIG. 11 shows the estimated temperature profile to compare the total radiation losses of the single stage and two-stage superheaters.

For the two-stage configuration, the thruster is operated by maintaining the heater block temperatures over the full test duration at 200° C. To fire the thruster, the superheater is first enabled, followed shortly by the activation of the motor driven feed. FIG. 12 shows the device in operation with propellant flowing through the superheater. The coiled section, where the propellant is evaporating, is relatively cool and does not glow, while the short thin-walled section glows red as it heats the gas.

Figure 13:
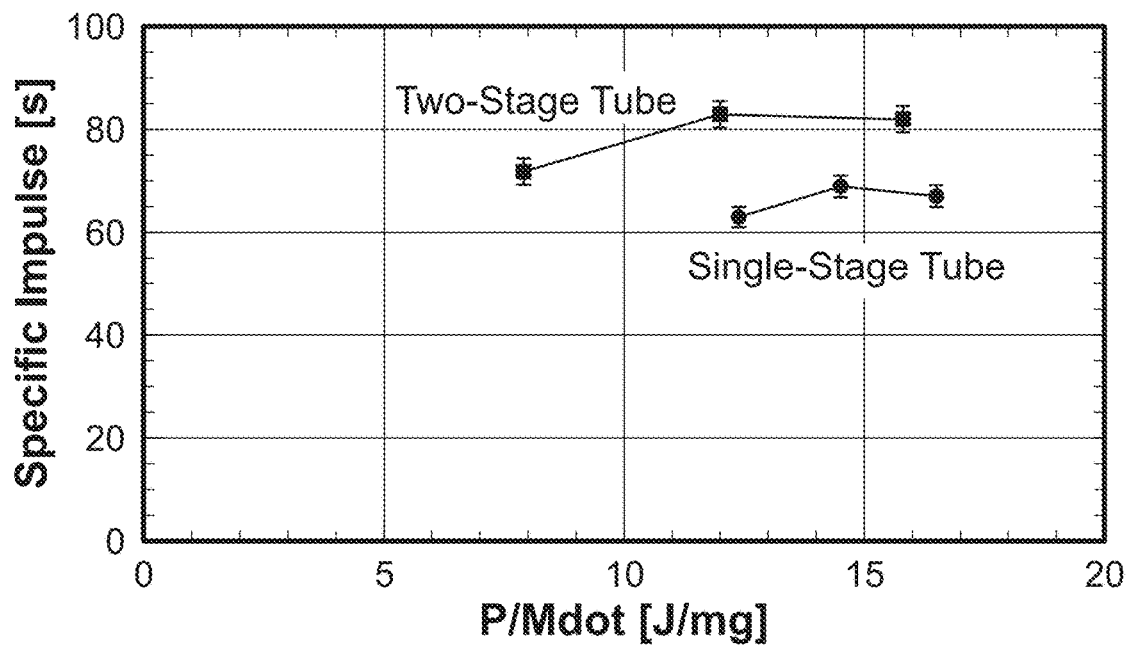
FIG. 13 is a superheater tube geometry performance comparison.

The initial data for the two-stage superheater tube is presented in Table 3. On the thrust stand, the two-stage superheater significantly outperformed the single coil, shown in FIG. 13. The higher performance allowed for increased mass flow rate (and thus higher Reynolds number). The peak specific impulse of 100 seconds is very encouraging, and approaches the preliminary proposed value of 127s. Note that Table 3 shows that there is clearly a P/mdot optimization that must be performed as the highest Isp performance was obtained with 40 W and the highest flow rates of 3.75 and 4.56 mg/s, not the highest P/mdot. For accuracy, specific impulse is plotted versus specific energy (power/mdot) to account for small fluctuations in the feed rate.

TABLE 3

Two-stage superheater tube results, POM propellant

| Power (W) | mdot (mg/s) | P/mdot (J/mg) | Thrust (mN) | Isp (s) |
|---|---|---|---|---|
| 20 | 2.54 | 7.9 | 1.78 | 72 |
| 30 | 2.51 | 12.0 | 2.04 | 83 |
| 40 | 2.53 | 15.8 | 2.03 | 82 |
| 40 | 3.68 | 10.9 | 3.28 | 91 |
| 40 | 3.75 | 10.7 | 3.66 | 100 |
| 40 | 4.56 | 8.8 | 4.43 | 99 |

Figure 14:
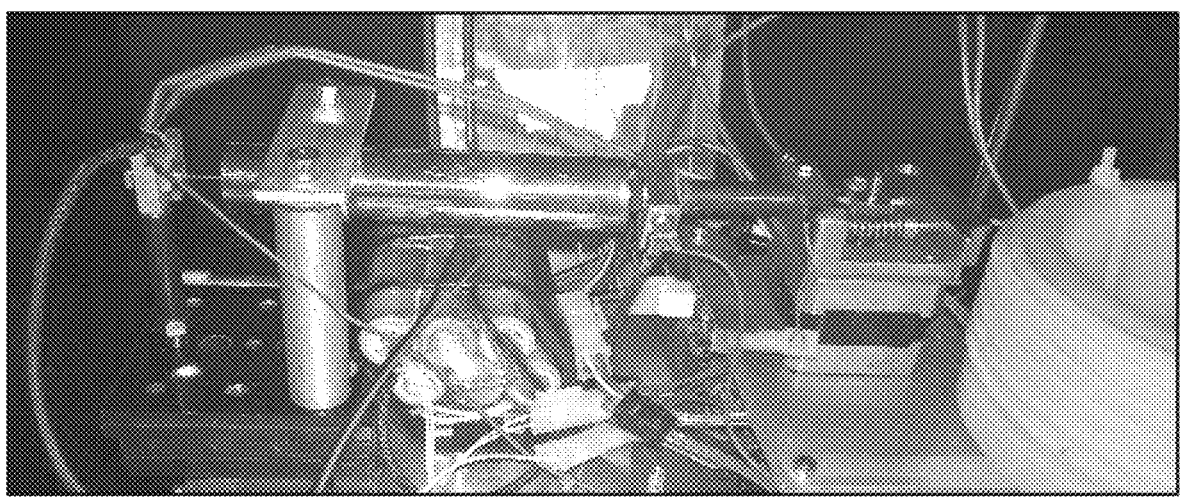
FIG. 14 is an MVP system breadboard setup with radiation shield (propellant flow is left to right)

Following these results, the next priority for thrust stand testing was to reduce power consumption. A radiation shield consisting of polished copper was installed around a two-staged superheater. Furthermore, the turbo-molecular pump was enabled for the remaining thrust stand tests, since there were suspected convective thermal losses on the order of 1-2 W. FIG. 14 shows the apparatus, equipped with the radiation shield, installed on the thrust stand.

Figure 15:
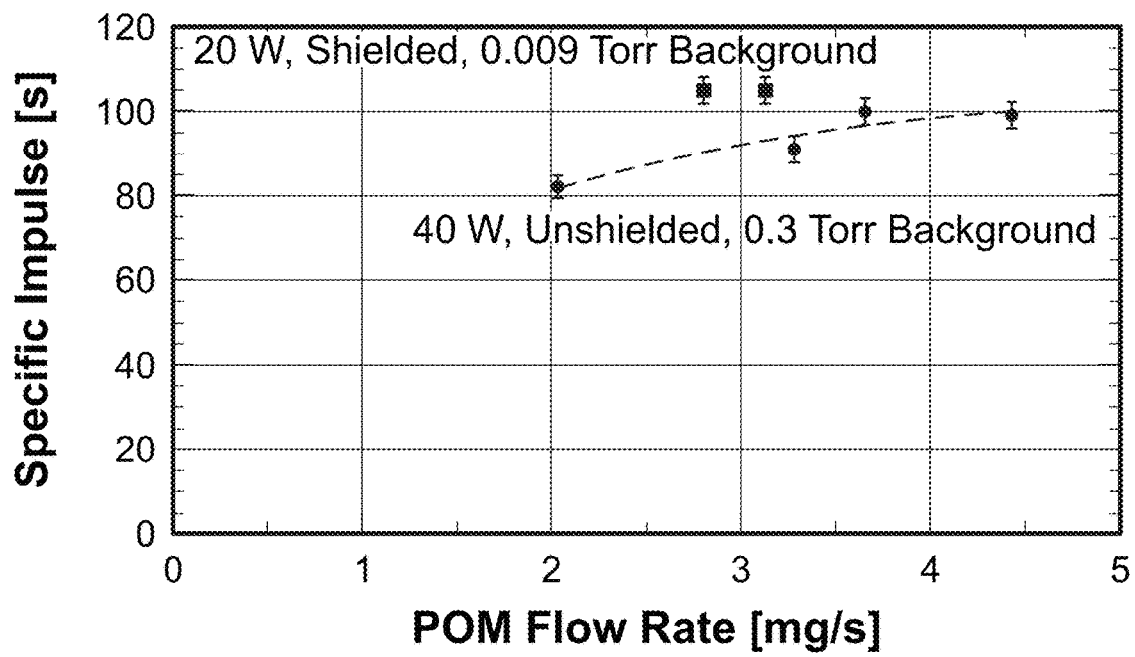
FIG. 15 is a comparison chart between shielded and unshielded two-stage superheaters.

With the shield implemented, and the lower background pressure, MVP saw a significant increase in thermal efficiency. Cases previously requiring 40 W input power are now achievable with 20 W. Table 4 below shows some cases using the improved apparatus. To better illustrate the effect of the shielding, FIG. 15 shows the 20 W shielded performance points on the same chart as several 40 W unshielded points. The effectiveness of the shielding exceeded expectations, and may eliminate the need for a two-stage design. Further testing of various superheater configurations is ongoing.

TABLE 4

Shielded two-staged superheater, POM propellant

| Power (W) | mdot (mg/s) | P/mdot (J/mg) | Thrust (mN) | Isp (s) |
|---|---|---|---|---|
| 20 | 2.80 | 7.2 | 2.87 | 105 |
| 20 | 3.13 | 6.4 | 3.21 | 105 |
| 27 | 3.23 | 8.4 | 3.40 | 107 |

MVP System Design

Figure 16:
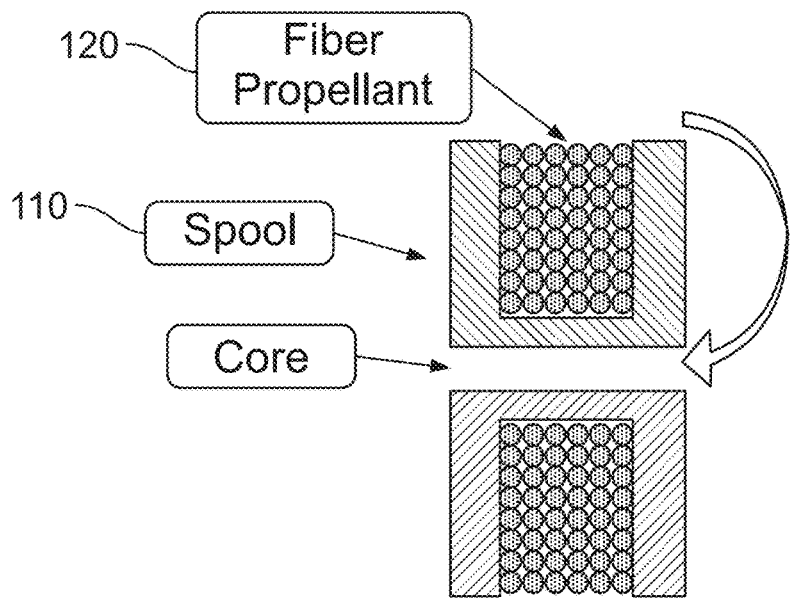
FIG. 16 is a propellant storage and feed methodology chart, illustrating the feed of fiber propellant around the spool rim into the core.

Superheater modifications were made with careful consideration of packaging constraints of a volume-limited thruster system. We are confident that the configurations tested can be packaged within the target 1U form factor. As such, this task focused on producing a mockup of the feed system followed by an initial 1U MVP solid model design. FIG. 16 shows the desired method of propellant storage. The coiled propellant is pulled off the end of the spool and through the core. A clear acrylic mockup of a 1U MVP system was built in order to define the tolerances required for a smooth, reliable feed. FIG. 17 shows the mockup in a sequence of photographs as a function of time as its propellant load is being drawn by the feed system used on the breadboard assembly.

In this iteration of the hardware, the far right spool face is mounted on a bearing, and the propellant is fed through a small hole in the rear of the outer edge of the face. This configuration allows the face to spin as propellant is drawn, but not the entire spool. The fixed face variant (not shown) also has shown reliable operation in mockup, and is currently included in the prototype design. Extensive testing of the feed system is underway.

Figure 19A:
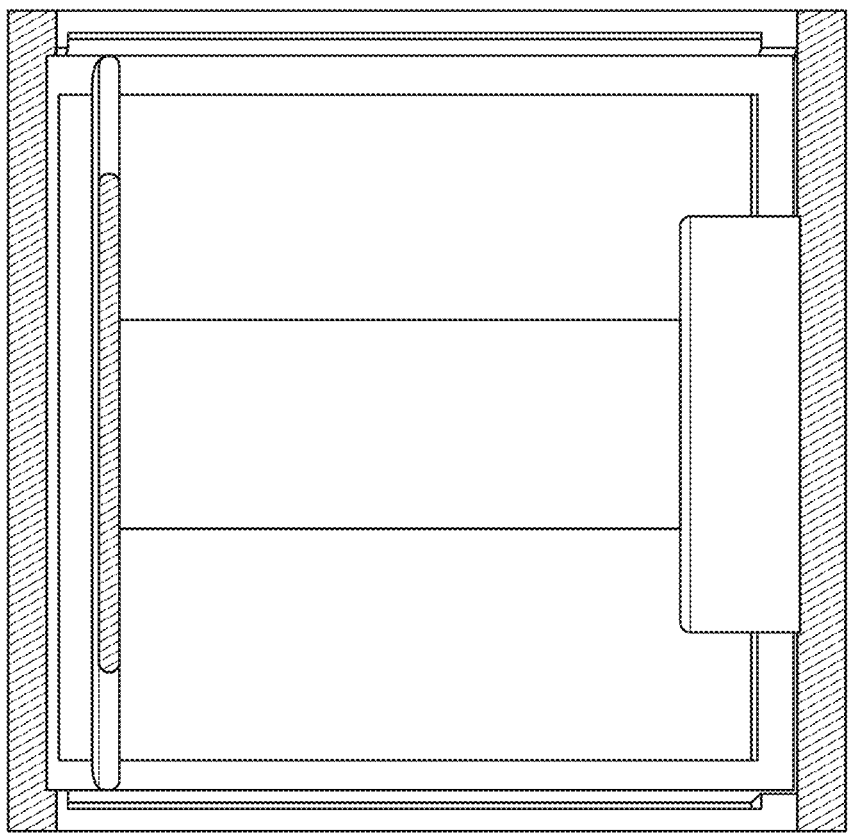
FIG. 19 shows MVP spool details.
Figure 19B:
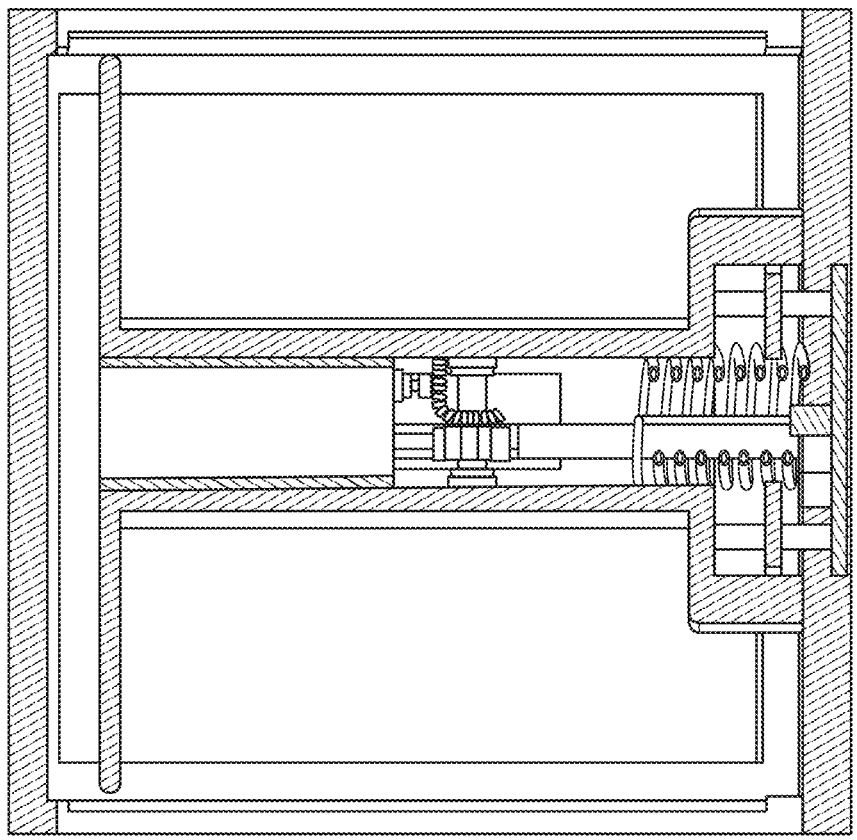

FIGS. 18A through 19 illustrates one embodiment of the MVP Thruster system. As shown, all the components of the breadboard apparatus are packaged within the trunk of the spool. A vacuum rated stepper motor with gear reduction drive was chosen to match the torque and feed rates of the NEMA 23 stepper motor used in the breadboard testing. Note that there is a flow channel within the heater block to turn the propellant from the incoming barrel into the superheater. Furthermore, both nozzle and heater block are to be bolted to the alumina face plate. These must be electrically isolated from each other, otherwise current will not flow through the length of the superheater. A polished interior of the spool core will act as a radiation shield for the superheater; configurations with a smaller coil diameter and additional shielding are under consideration.

As illustrated, the monofilament vaporization propulsion (MVP) system 100 includes a spool 110 that has a shaft 115. A monofilament solid propellant 120 is wound around the shaft of the spool. A mechanical feed 125 is provided and includes an inlet 130 to receive the solid propellant 120. An elongated barrel 135 is provided with a first end 140 in communication with an exit end 132 of the mechanical feed 125. The elongated barrel 135 is configured to receive and feed the solid propellant 120 through the elongated barrel towards a second end 145 defined by the elongated barrel and positioned distal to the first end 140. When the mechanical feed 125 is activated, the solid propellant moves out of the exit end 132 of the mechanical feed 125 through the elongated barrel 135 towards the second end 145 of the elongated barrel 145. A heater block 147 is positioned near the second end 145 of the barrel 135 and configured to heat the propellant into a liquid propellant as the solid propellant moves towards the second end 145 of the elongated barrel. While referred to herein as a superheater tube, in practice, there is provided a tube with a depolymerization section and a superheat section, generally referred to herein as a superheater tube 150 has an entrance section 155 in communication with the second end 145 of the elongated barrel 135 to receive the liquid propellant. The superheater tube 150 is further configured to evaporate the liquid propellant into a gaseous propellant by the time the propellant moves to the exit section 160 of the superheater tube 150. The system further has a nozzle 170 with a nozzle entrance 175 in communication with the exit section 160 of the superheater tube 150, such that the gaseous propellant being fed into the nozzle entrance 175 expands through the nozzle to create propulsion out of a nozzle exit 180.

In one embodiment of the present invention the elongated barrel 135 is internally lined with a PTFE material. In another embodiment, the superheater tube 150 is further defined as having the coil section 190 between the entrance 155 and exit sections 160. The coil section 190 may be wrapped around a portion 193 of the elongated barrel from the second end 145 of the elongated barrel towards the first end 140 of the elongated barrel. The exit section 160 is configured to run from an end 195 of the coil section 190 towards a position 197 adjacent to second end 145 of the elongated barrel. In yet another embodiment, the monofilament vaporization propulsion system of claim 1, wherein shaft of the spool is hollow and configured to house the mechanical feed, elongated barrel, heater block, superheater tube, and a portion of the nozzle.

In additional thereto, the heater block may have a temperature set above the melting point of the solid propellant. In yet more aspects of the invention the entrance and the exit sections of the superheater tube are in communication with the heater block such that heat radiated from the superheater tube lowers a power consumption needed to set the temperature of the heater block. As provided, the nozzle 175 and the heater block 147 may be secured to an alumina face plate

210. However, the nozzle and the heater block would be electrically isolated from each other.

Not shown in these drawings are the power electronics. The small PCB 220 seen in the cutout serves as a breakout board for the necessary wiring going inside the spool. Power electronics mounting is planned for the corners of the box, as the spooled propellant does not extend to the corners. These could include the addition of magnetic torque coils, giving MVP attitude control capabilities in earth orbit.

Thruster System Analyses

During the early development effort, measured performance saw frequent improvements towards theoretical expectations. To date, the specific impulse is 84% of the proposed value, and thus ΔV for a 4 kg satellite is approximately 200 m/s ΔV if no further improvements are made. Performance parameters of the baseline flight model MVP system are shown in Table 5 for measured performance values and projected performance, after improvements have been made to optimize the superheater tube, nozzle (including polishing), and radiation shielding around the superheater for higher efficiency.

TABLE 5

Baseline MVP performance

| Item | MVP Performance (Measured) | MVP Performance (Projected) |
|---|---|---|
| Propulsion system volume | 1000 cc | |
| System lifetime | Not propellant limited | |
| Spacecraft temperature range | Not propellant limited | |
| Propellant storage volume | 495 cc | |
| Propellant | POM, gaseous $CH_2O$ MW = 30 | |
| Propellant mass | 698 g | |
| Total propulsion wet mass | 1000 g | |
| Nominal mass flow rate | 3.2 mg/s | 3.2 mg/s |
| Total thrust time | 61 hr | 61 hr |
| Specific Impulse | 107 s | 132 s |
| Primary thrust | 3.4 mN | 4.1 mN |
| Total impulse | 733 N-s | 904 N-s |
| Spacecraft ΔV, M(initial) = 4 kg | 201 m/s | 248 m/s |
| Spacecraft propulsion power | 27 W | 25 W |

Note that by adjusting mass flow rate, power requirements can be significantly altered. Thrust will scale linearly with mass flow rate. Depending on the available bus power, performance of the system can be increased or decreased to meet the requirements.

This level of power is consistent with that of CUA Propulsion Unit for CubeSats (PUC). PUC consumes roughly 15 W of power and is in preparation for integration on a 6U system, with future use on a 3U CubeSat. CHIPS is an option for NASA's NEA Scout mission which has 25 W available for each of two thruster cartridges. This suggests 15-25 W is an acceptable power level for a CubeSat propulsion system. Furthermore, the electronics used to power the CHIPS superheater have been developed to a "prototype flight-like" configuration, and can supply in excess of 30 W. A repackaging of this power supply for MVP is planned as it reduces risk and eliminates the cost of developing a new board.

Decomposition and Modeling of the Propellant, POM.

The following analysis calculates the energy required to go from solid propellant to superheated vapor. Improved modeling of the POM depolymerization and evaporation was performed in order to refine the power requirements and thus have a better understanding of power losses and their associated mechanisms. Predicting polyoxymethylene (POM) heat transfer is difficult because, unlike simple single-phase laminar or turbulent gas flow, the POM flow pattern must be described by several phase regions and processes, some of which are poorly characterized. The situation is outlined in Table 6.

TABLE 6

MVP Heater Fluid Regions

| Region | Description |
|---|---|
| 1. Hot end (entrance) | Solid POM filament, 1.75 mm diameter, is melted at 200 C. and liquid POM is injected into the sub-mm heater tube, filling the heater tube. |
| 2. Injection region | The heater wall temperature increases to >300 C. |
| 3. Warming region | The liquid POM warms to ~300 C., reducing liquid viscosity significantly, similar to SAE 30W at 20 C. |
| 4. Depolymerization on-set | The liquid POM depolymerizes near the wall, forming formaldehyde (CH2O) liquid which immediately vaporizes and escapes from the liquid POM. The vapor is initially trapped in the tube by liquid POM, and eventually nucleates into bubbles aligned in the center of the tube. The quality of the two-phase flow is initially near 0%. |
| 5. Depolymerization region | The CH2O vapor acquires an axial flow velocity along the tube, forcing the liquid POM to the hot wall, and dragging the POM down the tube via shearing film effects. The hot wall maintains >300° C. in the POM to continue depolymerization. |
| 6. Core vapor flow/ Annular liquid flow | CH2O vapor flows at increasing velocity in the heater tube, dragging the liquid POM along. The tube is coiled, so that centrifugal force moves the liquid towards the outside of the curved tube. After reaching the wall, the liquid bifurcates and flows back along the tube wall towards a stagnation point on the inside of the curved heater tube. Because depolymerized CH2O continues to escape the liquid, the liquid is not in wall contact, but is supported on the vapor "bearing," greatly reducing heat transfer from wall to liquid. (Leidenfrost Effect). The liquid could be a continuous sheet or could break up into drops. The high heat of depolymerization and vaporization tends to reduce wall temperature. |

TABLE 6-continued

MVP Heater Fluid Regions

| Region | Description |
|---|---|
| 7. Dryout region | Nearly all the POM is depolymerized and evaporated, and the quality approaches 100%. The Leidenfrost (vapor bearing, reduced heat transfer) effect and the high velocity of the vapor, 10 s of m/s, drags the remaining drops at high speed along the tube, lengthening the final evaporation stage. |
| 8. Superheat region | The fully evaporated flow has a quality of 100% and flow is laminar. Both vapor and tube wall temperature increase in the superheat region. Flow times are measured in milliseconds. Heat transfer can be accurately predicted in this region. In this higher temperature region, the CH2O can break down into other primary constituents such CO and H2. |
| 9. Nozzle entrance region | Close to the nozzle the wall temperature decreases, but flow times are short, and the vapor temperature decrease is small. |
| 10. Nozzle Expansion region | Vapor vibrational modes are frozen, creating a frozen flow loss. |

The length of each of the regions in Table 6 is difficult to determine, being a function of poorly understood heat transfer rates and the required enthalpies. The required enthalpies are calculated from the heats of formation at each stage, as shown in Table 7.

TABLE 7

Enthalpy Processes in the MVP POM Heater

| Quantity | Value, kJ/g |
|---|---|
| Heating solid POM to 200 C. | 0.26 |
| POM transition from solid to liquid | 0.27 |
| Heating liquid POM to 300 C. | 0.28 |
| Depolymerizing POM to Formaldehyde | 1.34 |
| Formaldehyde vaporization upon depolymerization | 0.81 |
| Heating vapor POM to final temperature (900 C.) | 1.19 |
| Total enthalpy increase | 4.15 |
| Available nozzle enthalpy (frozen) | 1.30 |
| Ideal specific impulse | 164 s |

Test Results Indicating the POM Formulation Best for the Thruster (Delrin 500P)

TGA (thermal gravimetric analysis) was performed on the commercially available Delrin 500P filament, along with other formulations of interest. The goal was to choose the formulation that leaves the least residue behind after evaporation. 500P contains a release agent and lubricant additive for easier processing, and we suspected these additives were contributing to the eventual clogging of the superheater. Samples of Delrin 500 and Delrin 150 were obtained, each containing a release agent, but no added lubricant. Delrin 150 is a higher viscosity formulation with longer chain lengths. Each of the Delrin formulations are homopolymers, so a POM copolymer was also obtained, Acetron GP. While the Delrin 150 or Acetron GP were expected to outperform the current 500P fiber, TGA results showed that Delring 500 and 500P had the least residue, with the 500P (which was used for all thruster operation so far) being the best. TGA results comparing these two formulations is shown in FIG. 20 below, with Delrin 500P showing 99.6% evaporation.

Nozzle Modeling with BLAZE Multiphysics

To provide a more detailed theoretical understanding of the performance of the MVP nozzle and aid in design to minimize the impact of the boundary layer and maximize nozzle efficiency, CU Aerospace utilized its internally developed BLAZE Multiphysics™ Simulation Suite in order to construct high-fidelity simulations of the MVP micro-nozzle.

2D-axisymmetric grids were constructed to investigate the MVP micro-nozzle and determine if there is a geometry that looks more promising for further experimental investigation. 2D-axisymmetric BLAZE simulations for the experimentally tested MVP nozzle geometry having a 0.0156" diameter throat, 0.1" diameter exit (area ratio of 41.1), and 20° nozzle half-angle at a flow rate of 3 mg/s are shown in FIGS. 21A/B. Note that all dimensions were expanded by 0.7% to account for thermal expansion of the nozzle from the warm gas flow; this results in a throat diameter of 0.01571" and nozzle exit diameter of 0.1007". FIG. 21A/B shows that the boundary layer is substantial and the BLAZE CFD results support the basic theoretical hypothesis that the tested nozzle at a flow rate of 3 mg/s would result in a large boundary layer.

Table 8 compares the BLAZE 2D-axisymmetric results with data. BLAZE is found to over-predict experimental thrust and Isp by 15-20%. This is likely a result of some combination of the following reasons:

BLAZE simulations assumed no vibrationally/rotationally excited molecular states of $CH_2O$ (formaldehyde) into which thrust energy can be lost BLAZE simulations assumed that the POM propellant material was entirely decomposed into $CH_2O$ The 2D-axisymmetric grid geometry does not fully capture the 3D effects in the nozzle flow Table 8. BLAZE Multiphysics MVP simulation results with 2D-axisymmetric grid. Note that inlet temperatures of 973 K and 1173 K are estimated to correspond to experimental conditions with 20 W and 30 W of input power to the MVP system, respectively.

| Mass Flow Rate (mg/s) | Nozzle Inlet Temperature (K) | Exp. Thrust (mN) | Exp. Isp (s) | BLAZE Thrust (mN) | BLAZE Isp (s) | 2D-axisym. Error (%) |
|---|---|---|---|---|---|---|
| 3.0 | 973 | 2.60 | 88 | 2.98 | 102 | +15.9% |
| 3.0 | 1173 | 2.85 | 92 | 3.24 | 110 | +19.6% |

Figure 23:
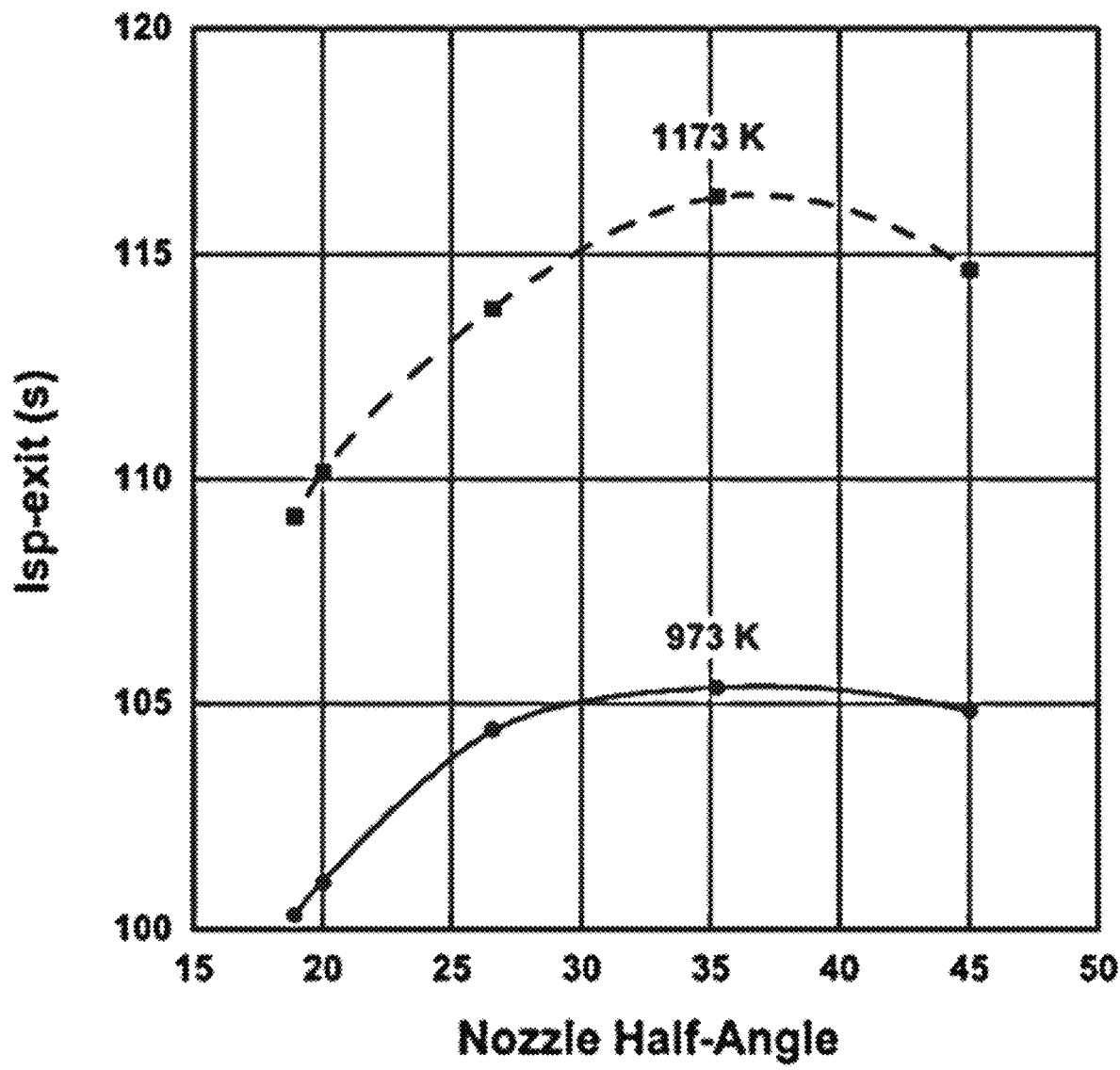
FIG. 23 is a chart illustrating Blaze predictions of nozzle exit Isp vs. nozzle half-angle as a function of total (inlet) temperature.

Based upon the theoretical hypothesis that nozzles with a larger half-angle would provide better performance, a series of 2D-axisymmetric calculations were run using modified grids for nozzles with half-angles ranging between 18° to 45° with a fixed area ratio of 41.1, FIGS. 22a and 22b. A direct comparison of the exit Isp predicted for the two different temperatures is shown in FIG. 23. Two important results are observed from this modeling:

a. Performance peaks with nozzle having a 35° half-angle and should provide ~5% greater Isp than the previously tested 20° half-angle nozzle for both 973 K and 1173 K.
b. With the smaller half-angle nozzles (<30°), the thrust inside the nozzle (roughly half-way down the nozzle from the throat) is higher than the thrust at the exit of the nozzle; this is a common characteristic of poorly designed nozzles for given flow conditions.

Note that these results are consistent with recent experimental studies using low Reynolds number micro-nozzles flowing N2 gas. As a result of these calculations, a 35° half-angle nozzle that maintains a throat diameter of 0.0156" and exit diameter of 0.10" (area ratio of 41) is recommended for future experimental testing.

FIGS. 24A/B illustrates the predicted flow from 2D-axisymmetric BLAZE simulations for a nozzle geometry having a 0.0156" diameter throat, 0.1" diameter exit (area ratio of 41.1), and 35.3° nozzle half-angle at a flow rate of 3 mg/s. The fraction of the nozzle filled by the boundary layer is noticeably smaller than calculated for the 20° nozzle shown in FIGS. 21A/B. As shown in FIGS. 21a-24b, BLAZE predicts that the 35.3° nozzle should result in approximately a 5% increase in Isp at both 973 K and 1173 K.

The theoretical analyses indicated that a higher mass flow rate can significantly reduce the boundary layer thickness in the nozzle and thereby improve the Isp. Experimental work with increased mass flow indicated that a mass flow rate of 7 mg/s should be achievable, therefore BLAZE computations were performed to estimate the impact on nozzle performance at this higher flow rate. Table 9 shows that the predicted Isp increases by 13-16% at the higher flow rate. FIGS. 25A/B illustrates a clear reduction in boundary layer thickness with 7 mg/s flow rate as compared to FIG. 21A/B with 3 mg/s. Nozzle exit profiles from the 3 and 7 mg/s cases are shown in the FIGS. 26-29; in particular, note that the velocity profile is significantly flatter near the centerline and the temperature profile significantly lower for the 7 mg/s case than for the 3 mg/s case, thereby indicating a more favorable nozzle flow.

Table 9. BLAZE Multiphysics MVP simulation results with 2D-axisymmetric grid as a function of mass flow rate and inlet temperature for the 20° half-angle nozzle shown in FIGS. 21A/B.

| Mass Flow Rate (mg/s) | Nozzle Inlet Temperature (K) | BLAZE Thrust (mN) | BLAZE Isp (s) | Isp Increase (%) |
|---|---|---|---|---|
| 3.0 | 973 | 2.98 | 102 | |
| 3.0 | 1173 | 3.24 | 110 | |
| 7.0 | 973 | 7.97 | 116 | +13.7% |
| 7.0 | 1173 | 8.72 | 127 | +15.5% |

Summary of BLAZE Results

The following summarizes the results from the 2D-axisymmetric BLAZE Multiphysics simulations:

a. A nozzle having a 35° half-angle should provide ~5% greater Isp than the previously tested 20° half-angle nozzle.
b. Due to overdeveloped boundary layers at the low MVP flow rates, nozzles having a half-angle <30° predict a higher thrust inside the nozzle than at the nozzle exit plane for an area ratio of ~41.
c. A mass flow rate increase from 3 mg/s to 7 mg/s will provide ~15% higher Isp.
d. Compared with data, 2D-axisymmetric BLAZE simulations are 15-20% higher in thrust and Isp, likely due to simplifying assumptions in the modeling (ground state $CH_2O$ only, and 2D-axisymmetric rather than full 3D).

Risk Assessment

The MVP thruster is a new approach to electric propulsion, but the technology carries low risk. Early development tasks were specifically chosen to eliminate these risks at the earliest possible stages of development.

Evaporator Stability: The MVP evaporator (3D printer based extrusion head followed by superheater) is key to the innovation, and is required to reliably evaporate solid propellant over long durations. With carefully selected geometry and heat conduction paths, the design incorporates passive measures against clogging, condensing, and sputtering. Testing and engineering enhancements demonstrated consistent stable operation with POM polymer fibers, therefore this risk is retired.

Feed System: This is deemed a smaller risk to the overall success of MVP system as developed 3D printer technology will be used. In the event the propellant fiber snaps, the unit will be completely inoperable, but the large fiber diameter currently in use cannot be broken with the available feed motor torque. Unlike a liquid propellant system, the failure of an MVP device cannot harm the spacecraft, as removing bus power results in a completely static, inert system. Preliminary testing resulted in a reliable storage and feed method, although further miniaturization is required for some components. It is believed that this risk is minimal, and further development is in progress.

Another risk is the torque applied to the spacecraft by the spinning feed motor. The main propellant mass is left stationary, but the spinning motor and unspooling winds could apply torques to the spacecraft. Motor rotation will be opposed to the unspooling direction in an effort to minimize this torque. Future calculations will determine the compensation required by ACS.

Plating/Condensation: During thruster operation there exists the possibility of propellant plating out on other satellite subsystems. The low flow rates, low system pressure, and low total propellant mass of the device will minimize this effect, but will not eliminate it. Early testing demonstrated some condensation on the witness plate directly in the path of the thruster exhaust, but no condensation on the acrylic vacuum chamber walls. Therefore, we believe that this testing has largely retired this risk. DSMC plume modeling of this effect will be investigated future work, and any build-up of spent propellant on test hardware will continue to be monitored in ongoing testing.

Vibration: The evaporator is a compact device with a coiled superheater supported at both ends, and damage from vibration during launch is not of immediate concern. There is a possibility for resonance in the tube, but the low mass and high strength should prevent damage, even if the superheater comes into contact with its shielding. Further support for the superheater will be implemented if resonance problems arise. The propellant storage could present some vibration issues, but careful design of the propellant spool support structure should mitigate any problems. This will be tested on multiple subsystems and the MVP flight unit.

Safety and Health Plan

The polymer propellants used by the MVP system are completely inert in all foreseeable laboratory environments. Thruster operation is already limited to a vacuum environment as components will oxidize and be destroyed in atmospheric oxygen at high temperatures. The production of formaldehyde gas from POM propellant is the largest health risk of the program. The facility is equipped with a scrubber for the exhaust of the vacuum pump. A detector was purchased as well as respirator cartridges designed for $CH_2O$. No issues have been encountered to date.

Technical Objectives

The primary technical objectives of the development program were to prove stable, reliable operation of a breadboard MVP system, obtain preliminary thrust performance, and refine the prototype design to a more integrated system for future development and testing. Additionally, we demonstrated efficient heat transfer and evaporation of polymer fibers in a continuous fashion without condensation or plugging issues, along with reliable and accurate metering of the propellant feed system.

Our goal is to design, fabricate, test and deliver a flight-like thruster system to NASA (and other future customers). CUA will need to perform the following tasks to reach this goal:

Benchtop testing of flight-like feed system
Flight-like circuit boards (superheater power+feed stepper driver)
Two-stage superheater trade studies (with thrust stand testing)
Nozzle and plume modeling
Superheater life testing
Micro-nozzle design/fabrication (with thrust stand testing)
Refine full system design
Full system fabrication and integration
Acceptance testing (thrust stand, vibration, lifetime)
Conceptual design of an MVP system that includes ACS
Mission planning
Technology Maturation Status The MVP thruster is currently at Technology Readiness Level (TRL) 4. A baseline system has been designed with well-defined operational conditions for power (both losses and requirements), mass flow rate, pressure, and temperature, based on the material properties of the candidate propellants and related hardware designs. The design includes protections against condensation and nozzle clogging, and reliable restart capability has been demonstrated. Early hardware designs employed simple machining and manufacturing techniques, allowing the system's greatest risks to be tackled in the development program; as a result, CUA was able to implement engineering mitigation techniques that dramatically retired risk of this innovative thruster technology. TRL 4 was achieved during a NASA Phase I SBIR project, facilitating a jump to TRL 6 when ongoing efforts are completed. The MVP thruster system supports the NASA Roadmap for In-Space Propulsion Systems, nonchemical propulsion.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

We claim:

1. A monofilament vaporization propulsion system comprising:
a mechanical feed having an inlet to receive a monofilament solid propellant;
an elongated barrel having a first end in communication with an exit end of the mechanical feed, wherein the elongated barrel is configured to receive and feed the monofilament solid propellant through the elongated barrel towards a second end defined by the elongated barrel and positioned distal to the first end, and when the mechanical feed is activated the monofilament solid propellant moves out of the exit end of the mechanical feed through the elongated barrel towards the second end of the elongated barrel;
a heater block positioned near the second end of the elongated barrel is configured to heat the monofilament solid propellant into a liquid propellant as the monofilament solid propellant moves towards the second end of the elongated barrel;
a tube with a depolymerization section and a superheat section, having an entrance section in communication with the second end of the elongated barrel to receive the liquid propellant, the tube configured to evaporate the liquid propellant into a gaseous propellant, and the tube further having an exit section; and
a nozzle having a nozzle entrance in communication with the exit section of the tube is configured to expand the gaseous propellant being fed into the nozzle entrance there-through to create propulsion out a nozzle exit.

2. The monofilament vaporization propulsion system of claim 1, wherein the elongated barrel is internally lined with a PTFE material.

3. The monofilament vaporization propulsion system of claim 1, wherein the tube is further defined as having a coil section between the entrance section and the exit section, the coil section being wrapped cylindrically around a portion of the elongated barrel from the second end towards the first end and the exit section is configured to run from an end of the coil section towards a position adjacent to the second end.

4. The monofilament vaporization propulsion system of claim 1 further comprising: a spool having a shaft and wherein the monofilament solid propellant is wound around the shaft of the spool and feed into the mechanical feed.

5. The monofilament vaporization propulsion system of claim 4, wherein the shaft of the spool is hollow and configured to house the mechanical feed, elongated barrel, heater block, tube, and a portion of the nozzle.

6. The monofilament vaporization propulsion system of claim 1, wherein the heater block has a temperature set above a melting point of the monofilament solid propellant.

7. The monofilament vaporization propulsion system of claim 6, wherein the entrance section and the exit section are in communication with the heater block such that heat radiated from the tube lowers the power consumption needed to set the temperature of the heater block.

8. The monofilament vaporization propulsion system of claim 1, wherein the monofilament solid propellant is polyoxymethylene.

9. The monofilament vaporization propulsion system of claim 1, wherein the nozzle and the heater block are secured to a dielectric face plate, and wherein the nozzle and the heater block are electrically isolated from each other.

10. The monofilament vaporization propulsion system of claim 1, wherein the nozzle has a cross-section that is diverging or a cross-section that is first converging then diverging.

11. The monofilament vaporization propulsion system of claim 1, wherein the tube is further defined as having a coil section between the entrance section and the exit section, the coil section being a flattened spiral coil adjacent a portion of the elongated barrel from the second end towards the first end and the exit section is configured to run from a terminus of the coil section towards a position adjacent to the second end of the elongated barrel.

\* \* \* \* \*

UNITED STATES PATENT AND TRADEMARK OFFICE
CERTIFICATE OF CORRECTION

PATENT NO. : 10,724,480 B1
APPLICATION NO. : 15/922966
DATED : July 28, 2020
INVENTOR(S) : Curtis Woodruff et al.

Page 1 of 1

It is certified that error appears in the above-identified patent and that said Letters Patent is hereby corrected as shown below:

On the Title Page

Item [72], delete "Nejmanowski" and insert -- Hejmanowski --, therefor.

Signed and Sealed this
Twenty-second Day of September, 2020

Andrei Iancu
*Director of the United States Patent and Trademark Office*